(12) United States Patent
Koga et al.

(10) Patent No.: US 7,590,185 B2
(45) Date of Patent: *Sep. 15, 2009

(54) COMMUNICATION APPARATUS

(75) Inventors: Hisao Koga, Fukuoka (JP); Nobutaka Kodama, Fukuoka (JP); Taisuke Konishi, Kasuga (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/634,128

(22) Filed: Dec. 6, 2006

(65) Prior Publication Data

US 2007/0076809 A1  Apr. 5, 2007

Related U.S. Application Data

(63) Continuation of application No. 10/669,592, filed on Sep. 23, 2003, now Pat. No. 7,164,724.

(30) Foreign Application Priority Data

Sep. 25, 2002  (JP) .............................. 2002-278747

(51) Int. Cl.
  H04K 1/10    (2006.01)
  H04N 11/04   (2006.01)
(52) U.S. Cl. .................... 375/260; 375/240.19
(58) Field of Classification Search ............... 375/260, 375/240.18, 240.19, 261; 370/206, 210; 708/400, 402, 403; 704/269
See application file for complete search history.

(56) References Cited

U.S. PATENT DOCUMENTS 5,388,182 A    2/1995  Benedetto et al.
5,497,398 A    3/1996  Tzannes et al.
5,631,610 A    5/1997  Sandberg et al.
5,636,246 A    6/1997  Tzannes et al.
5,995,539 A   11/1999  Miller (Continued)

FOREIGN PATENT DOCUMENTS

FR          2800954          5/2001

(Continued)

OTHER PUBLICATIONS

N.G. Kinsbury discloses "Complex wavelets for shift invariant analysis and filtering of signals", Journal of Applied and Computational Harmonic Analysis, vol. 10, No. 3, May 2001, pp. 234-253.*

(Continued)

*Primary Examiner*—Khanh C Tran
(74) *Attorney, Agent, or Firm*—Dickinson Wright, PLLC

(57) ABSTRACT

A wave detecting section of a receiver has a first wavelet transformer involving a plurality of wavelet filters orthogonal to each other for performing a wavelet transform on received waveform data, a Hilbert transformer for performing a Hilbert transform on the received waveform data, a second wavelet transformer having the same configuration as that of the first wavelet transformer for performing a wavelet transform on outputs from the Hilbert transformer, a code converter for inverting the codes of outputs in odd-numbered places among outputs from the second wavelet transformer, a level converter for correcting fluctuations of outputs from the code converter attributable to a ripple of the Hilbert transformer, and a complex data generator for generating complex data, by defining outputs of the first wavelet transformer as in-phase components of the complex information and outputs from the level converter as orthogonal components of the complex information.

24 Claims, 21 Drawing Sheets

U.S. PATENT DOCUMENTS

| | | | |
|---|---|---|---|
| 6,473,409 | B1 | 10/2002 | Malvar |
| 6,487,574 | B1 | 11/2002 | Malvar |
| 6,493,666 | B2 | 12/2002 | Wiese, Jr. |
| 6,496,795 | B1 | 12/2002 | Malvar |
| 6,532,256 | B2 | 3/2003 | Miller |
| 6,947,509 | B1 | 9/2005 | Wong |
| 6,952,441 | B2 | 10/2005 | Peeters |
| 7,206,359 | B2 * | 4/2007 | Kjeldsen et al. ............. 375/316 |
| 2001/0036323 | A1 * | 11/2001 | Chui .......................... 382/276 |
| 2001/0048770 | A1 * | 12/2001 | Maeda ........................ 382/243 |
| 2003/0231714 | A1 | 12/2003 | Kjeldsen et al. |

FOREIGN PATENT DOCUMENTS

| | | |
|---|---|---|
| JP | 11252031 | 9/1999 |
| JP | 11275165 | 10/1999 |
| JP | 2001298439 | 10/2001 |
| WO | 01/35561 | 5/2001 |
| WO | 03063380 | 7/2003 |

OTHER PUBLICATIONS

Kok-Wui Cheong and John M. Cioffi "Discrete Wavelet Transorms in Multi-carrier Modulation", Information System Lab., Standford University, 1998.*

Kjeldsen et al., "System and Method for Orthogonally Multiplexed Signal Transmission and Reception", Mar. 29, 2002.*

Stuart D. Sandberg and Michael A. Tzannes, "Overlapped Discrete Multitone Modulation for High Speed Copper Wire Communications", IEEE Journal on selected areas in communications, vol. 13, No. 9, Dec. 1995.*

Henrique S. Malvar; "Signal Processing with Lapped Transforms," pp. 204-216.

International Search Report dated Mar. 9, 2004.

M.C. Sun, et al., "Power-Line Communications Using DWMT Modulation, " IEEE International Symposium on Circuits and Systems, vol. 4, XP-002271367, pp. 493-496, May 26-29, 2002.

E. Ozturk, et al., "Waveform Encoding of Binary Signals Using a Wavelet and its Hilbert Transform," Proceedings of 2000 International Conference on Acoustics, Speech and Signal Processing, vol. 5, XP010506549, pp. 2641-2644, IEEE, Jun. 5, 2000.

J. N. Livinston, et al., "Bandwidth Efficient PAM Signallng Using Wavelets," IEEE Transactions on Communications, vol. 44, No. 12, XP 000640579, pp. 1629-1631, IEEE, Dec. 1, 1996.

G. Cariolaro et al., "An OFDM System with a Half Complexity," Proceedings of the Global Telecommunications Conference, vol. 1, XP000488550, pp. 237-242, Nov. 28, 1994—Dec. 2, 1994.

H. Bolcskei, et al., "Design of Pulse Shaping OFDM/OQAM Systems for High Data-Rate Transmission Over Wireless Channels," International Conference on Communications, vol. 1, pp. 559-564, XP002139687, IEEE, Jun. 6-10, 1999.

J. Alhava, et al.; "Adaptive Sine-Modulated/Cosine-Modulated Filter Bank Equalizer for Transmultiplexers," ECCTD'01-European Conference on Circuit Theory and Design, Aug. 28-31, 2001, Espoo, Finland, pp. III-337-340.

A. Viholainen, et al.; "Implementation of Parallel Cosine And Sine Modulated Filters Banks For Equalized Transmultiplexer System," 2001, IEEE, pp. 3625-3628.

A. Viholainen, et al; "Complex Modulated Critically Sampled Filter Banks Based On Cosine And Sine Modulation," Institute of Communications Engineering, Tampere University of Technology, 2002, IEEE, pp. 1-833-836.

J. Alhava, et al.; "Exponentially, Modulated Filter Bank-Based Transmultiplexer," Tampere Univeristy of Technology, 2003, IEEE, pp. IV-233-236.

J. Alhava, et al.; "Efficient Implementation of Complex Exponentially-Modulated Filter Banks," Tampere University of Technology, 2003, IEEE, pp. IV-157-160.

Y. Yang, et al.; "DSP Implementation of Low-Complexity Equalizer For Multicarrier Systems," Institute of Communications Engineering, Tampere University of Technology, 2003, IEEE, pp. 271-274.

Japanese Office Action dated Nov. 22, 2006 with English translation.

European Office Action dated Jun. 24, 2008.

M. Hawryluck et al., "Efficient Equalization of Discrete Wavelet Multi-tone Over Twisted Pair," Broadband Communications, IEEE, 1998, p. 185-191.

I. W. Selesnick, "The Design of Approximate Hilbert Transform Pairs of Wavelet Bases," IEEE Transactions on Signal Processing, vol. 50, No. 5, May 2002, pp. 1-9.

Chinese Office Action dated Oct. 17, 2008 with English translation.

* cited by examiner

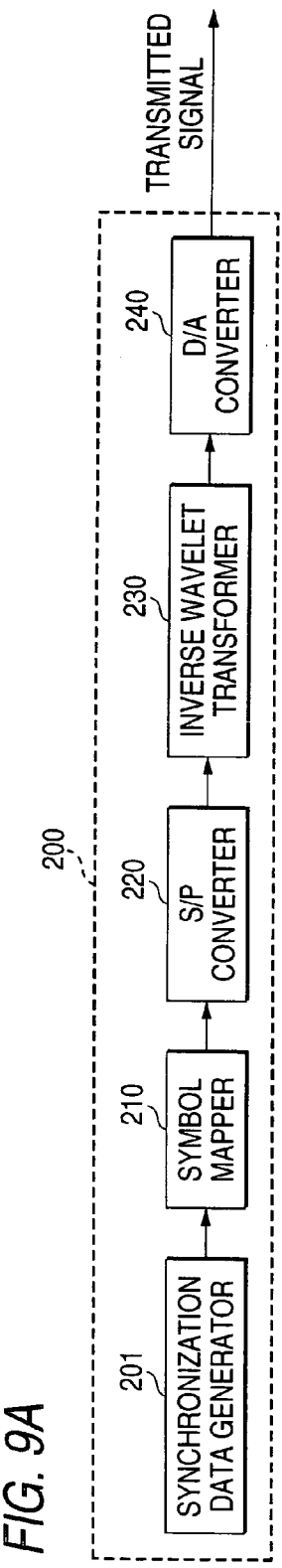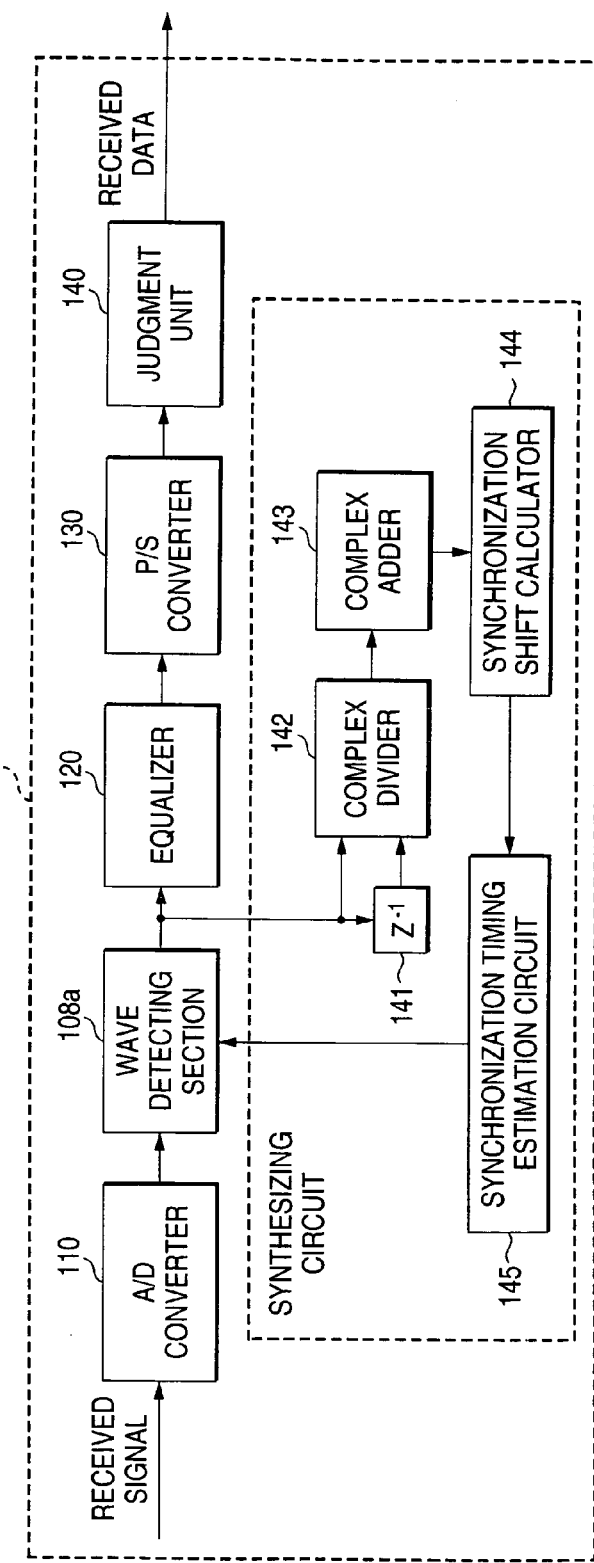
FIG. 9A
FIG. 9B

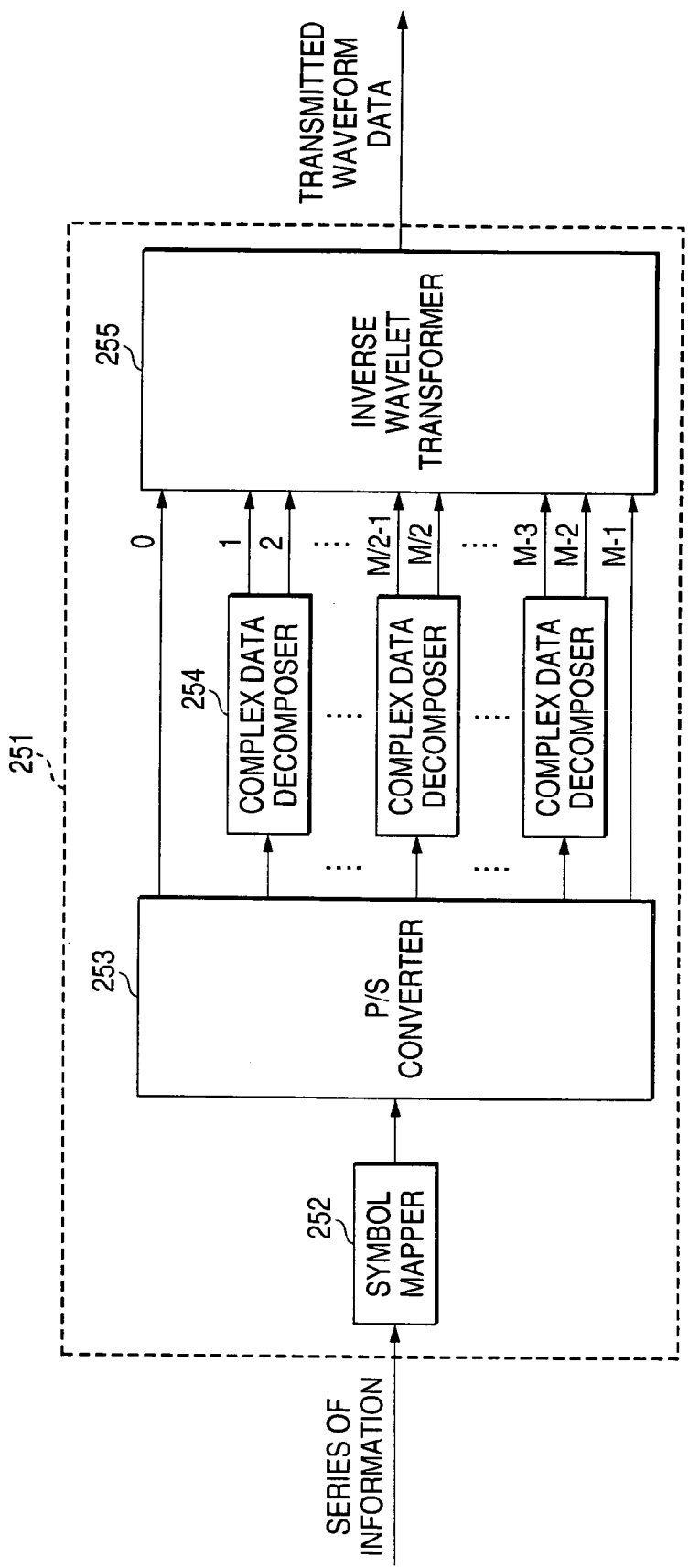

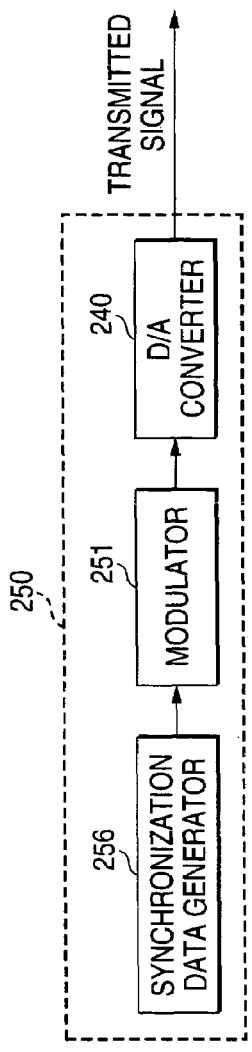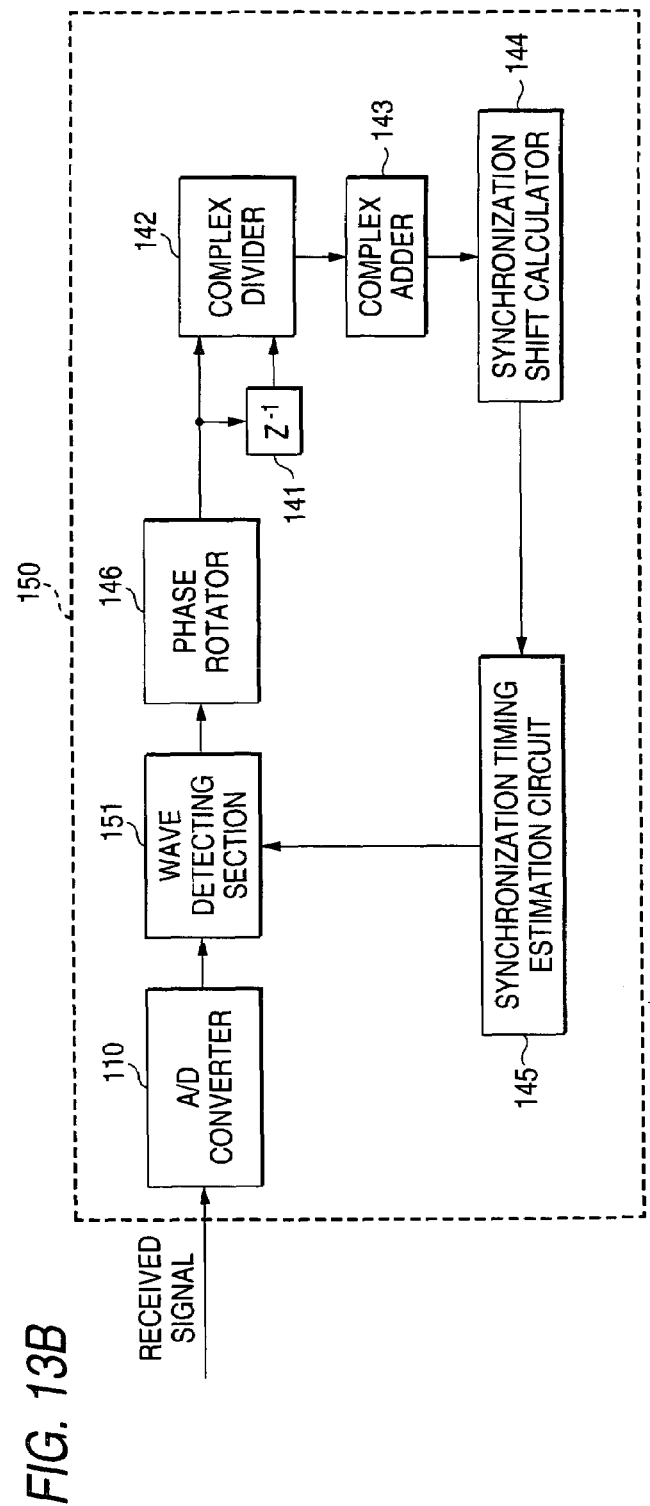

FIG. 18

| SYNCHRONI-ZATION SYMBOL | EQUALI-ZATION SYMBOL | INFORMATION SYMBOL |
|---|---|---|

COMMUNICATION APPARATUS

This is a continuation application of application Ser. No. 10/669,592, filed Sep. 23, 2003, the priority of which is claimed under 35 USC §120.

BACKGROUND OF THE INVENTION

1. Field of the Invention

The present invention relates to a communication apparatus employing a multi-carrier transmission method (Digital Wavelet Multi-Carrier transmission method, which is hereinafter referred to as "DWMC transmission method"), which performs data transmission with digital modulation and demodulation processes utilizing real coefficient wavelet filter banks.

2. Description of the Related Art

The transmission method involving digital modulation and demodulation processes utilizing real coefficient wavelet filter banks is a type of multi-carrier modulation method in which a plurality of digital modulated waves are synthesized using real coefficient filter banks to generate a transmission signal. PAM (pulse amplitude modulation) is used as a method for modulating each carrier.

Data transmission according to the DWMC transmission method will be described with reference to FIGS. 15 to 18. FIG. 16 is a waveform diagram showing an example of a wavelet waveform. FIG. 16 is a waveform diagram showing an example of a waveform transmitted according to the DWMC transmission method. FIG. 17 is a spectrum diagram showing an example of a transmission spectrum according to the DWMC transmission method. FIG. 18 illustrates a frame to show an example of a configuration of a frame transmitted according to the DWMC transmission method.

When data are transmitted according to the DWMC transmission method, as shown in FIG. 15, impulse responses of each subcarrier are transmitted in an overlapping relationship with each other in the subcarrier. Each transmission symbol becomes a time waveform that is a combination of impulse responses in each subcarrier, as shown in FIG. 16. FIG. 17 shows an example of an amplitude spectrum. According to the DWMC transmission method, transmission symbols as shown in FIG. 16 in a quantity ranging from several tens to several hundreds are collected to form one frame to be transmitted. FIG. 18 shows an example of a configuration of a DWMC transmission frame. The DWMC transmission frame includes symbols for frame synchronization and symbols for equalization in addition to symbols for transmitting information data.

FIG. 14 is a block diagram of a communication apparatus according to the related art comprised of a transmitter 299 and a receiver 199 employing the DWMC transmission method.

In FIG. 14, reference numeral 110 represents an A/D converter; reference numeral 120 represents an wavelet transformer; reference numeral 130 represents a P/S converter for converting parallel data into serial data; reference numeral 140 represents a judgment unit for judging a received signal; reference numeral 210 represents a symbol mapper for converting bit data into symbol data to perform symbol mapping; reference numeral 220 represents an S/P converter for converting serial data into parallel data; reference numeral 230 represents an inverse wavelet transformer; and reference numeral 240 represents a D/A converter.

An operation of the communication apparatus having such a configuration will now be described.

First, at the transmitter 299, the symbol mapper 210 converts bit data into symbol data, and symbol mapping (PAM modulation) is performed according to each item of the symbol data. The serial-to-parallel converter (S/P converter) 220 supplies each subcarrier with real numbers "di" (i=1 to M, M being a plural number) which are subjected to an inverse discrete wavelet transform on a time axis by the inverse wavelet transformer 230. Thus, sample values having time axis waveforms are generated to generate a series of sample values representing transmitted symbols. The D/A converter 240 converts the series of sample values into a base band analog signal waveform that is continuous in time, the waveform being then transmitted. The number of the sample values on the time axis generated by the inverse discrete wavelet transform is normally 2 to the n-th power (n is a positive integer).

At the receiver 199, the received signal is converted by the A/D converter 110 into a digital base band signal waveform that is then sampled at the same sample rate as that of the transmitter. The series of sample values is subjected to a discrete wavelet transform on a frequency axis by the wavelet transformer 120 and thereafter serial-converted by the parallel-to-serial converter (P/S converter) 130. Finally, the judgment unit 140 calculates the amplitude of each subcarrier to judge the received signal and obtain received data.

Since amplitude distortions and phase distortions can occur during communication because of impedance fluctuations of the transmission path and the influence of multi-path, a capability of treating both of amplitude and phase parameters, i.e., complex information will be convenient. However, the DWMC transmission method according to the related art does not allow distortions to be corrected depending on the condition of transmission paths because it is only capable of treating amplitude information, which results in a problem in that transmission efficiency is significantly reduced (see the following document, for example).

Hitoshi KIYA "Digital Signal Processing Series 14, Multi-Rate Signal Processing", Shokodo, Oct. 6, 1995, pp. 186-190

As thus described, a communication apparatus employing a transmission method utilizing real coefficient filter banks according to the related art has a problem in that it can treat only amplitude information as transmission data and in that a receiver cannot perform a process for treating complex information.

SUMMARY OF THE INVENTION

There are demands that such a communication apparatus should use the DWMC transmission method which allows complex information to be treated.

In order to satisfy the demands, the invention provides a communication apparatus employing the DWMC transmission method that allows complex information to be treated.

To solve the problem, the invention provides a communication apparatus employing a multi-carrier transmission method which performs data transmission with digital multi-carrier modulation and demodulation processes utilizing a real coefficient wavelet filter bank, which comprises a receiver that performs a digital multi-carrier demodulation process, wherein the receiver having a wave detecting section, the wave detecting section has: a first wavelet transformer involving M real coefficient wavelet filters, which are orthogonal with respect to each other, for performing a wavelet transform of waveform data of received signal; a Hilbert transformer for performing a Hilbert transform of the waveform data; a second wavelet transformer for performing a wavelet transform of outputs from the Hilbert transformer; and a complex data generator for generating complex data, by defining outputs from the first wavelet transformer as in-phase components of complex information and outputs from the second wavelet transformer as orthogonal components of the complex information.

Thus, there is provided a communication apparatus employing the DWMC transmission method that allows complex information to be treated.

BRIEF DESCRIPTION OF THE DRAWINGS

FIG. 9A is a block diagram of a transmitter that forms a part of a communication apparatus according to a sixth embodiment of the invention;

FIG. 9B is a block diagram of a receiver that forms a part of the communication apparatus according to the sixth embodiment of the invention;

FIG. 12 is a block diagram of a modulator that forms a part of a transmitter of a communication apparatus according to an eighth embodiment of the invention;

FIG. 13A is a block diagram of a transmitter of a communication apparatus according to a ninth embodiment of the invention;

FIG. 13B is a block diagram of a receiver of the communication apparatus according to the ninth embodiment of the invention;

FIG. 18 illustrates a frame to show an example of a configuration of a frame transmitted according to the DWMC transmission method;

DETAILED DESCRIPTION OF THE PREFERRED EMBODIMENTS

Preferred embodiments of the invention will now be described with reference to FIGS. 1 to 21. In the following embodiments, a wavelet transform is performed by a cosine modulation filter bank unless otherwise specified.

First Embodiment

Figure 1:
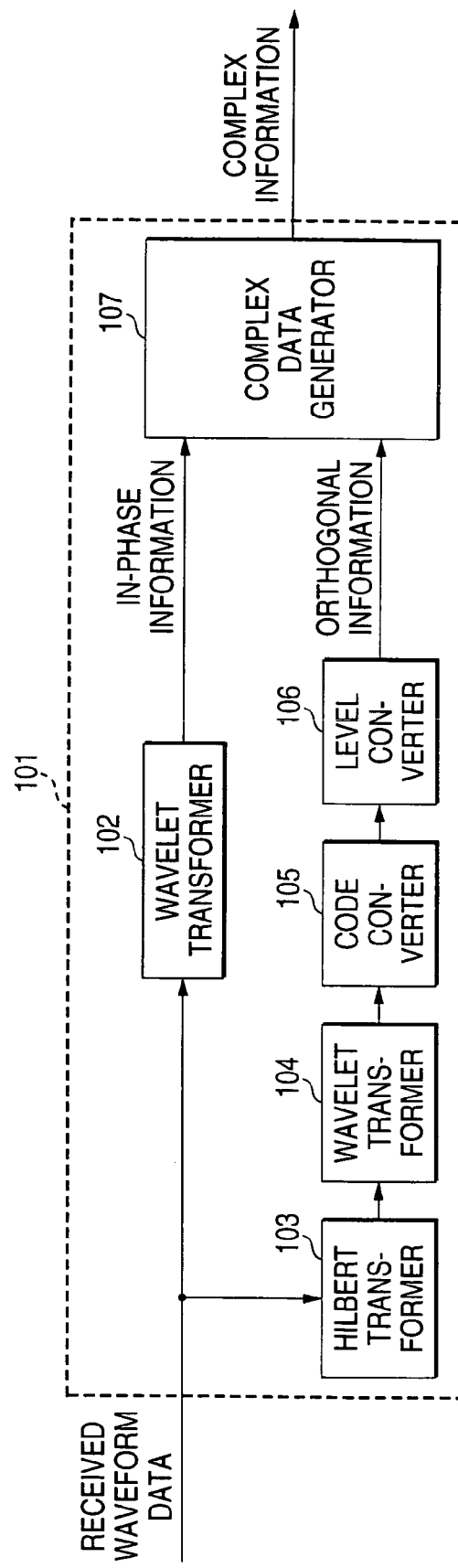
FIG. 1 is a block diagram of a wave detecting section that forms a part of a receiver of a communication apparatus according to a first embodiment of the invention.

FIG. 1 is a block diagram of a wave detecting section that forms a part of a receiver of a communication apparatus according to the first embodiment of the invention. A transmitter of the same is identical to the transmitter 299 in FIG. 14 in configuration.

In FIG. 1, reference numeral "101" represents a wave detecting section of a receiving unit; reference numeral "102" represents a wavelet transformer for performing a wavelet transform of waveform data of received signal (hereinafter, "received waveform data"); reference numeral "103" represents a Hilbert transformer for performing a Hilbert transform of the received waveform data; reference numeral "104" represents a wavelet transformer having the same configuration as that of the wavelet transformer 102 for performing a wavelet transform of outputs from the Hilbert transformer; reference numeral "105" represents a code converter for inverting codes in odd-numbered places among outputs "di" (i=0 to M, M being a plural number) from the wavelet transformer 104; reference numeral "106" represents a level converter for correcting fluctuations of the amplitude of data output by the code converter 105 attributable to ripple characteristics of the Hilbert transformer 103; and reference numeral "107" represents a complex data generator for generating complex data having a real part (I components) which is outputs from the wavelet transformer 102 and an imaginary part (Q components) which is outputs from the level converter 106.

An operation of the communication apparatus having such a configuration will now be described on an assumption that it accommodates M subcarriers to which subcarrier numbers 1 to M are assigned.

First, the wavelet transformer 102 performs a wavelet transform of waveform data that have been received to obtain a component that is in phase with each of the M subcarriers. The Hilbert transformer 103 performs a Hilbert transform of the received waveform data to generate waveform data in which each frequency component included in the received signal is shifted by $\pi/2$, and the wavelet transformer 104 obtains a component orthogonal to each subcarrier. At this time, since outputs in odd-numbered places from the wavelet transformer 104 are output with their codes inverted, the code converter 105 corrects them. Further, the amplitude of data in each subcarrier has fluctuated because of ripple characteristics of the Hilbert transformer 103, and the level converter 106 corrects the same. The complex data generator 107 generates complex data having in-phase components and orthogonal components that are constituted by outputs from the wavelet transformer 102 and the level converter 106, respectively.

Although the present embodiment has been described with reference to the use of two wavelet transformers having the same configuration, a configuration may be employed in which only one wavelet transformer is used. The level converter and the code converter are not required when a highly accurate Hilbert transformer or an equalizer for amplitude correction is used.

Since the present embodiment makes it possible to process not only amplitude but also phase information as described above, even if the synchronization of subcarriers is mistimed because of a bad condition of the transmission path attributable to a group delay and so on, the phase rotation of each subcarrier can be corrected to improve receiving performance.

Second Embodiment

Figure 2:
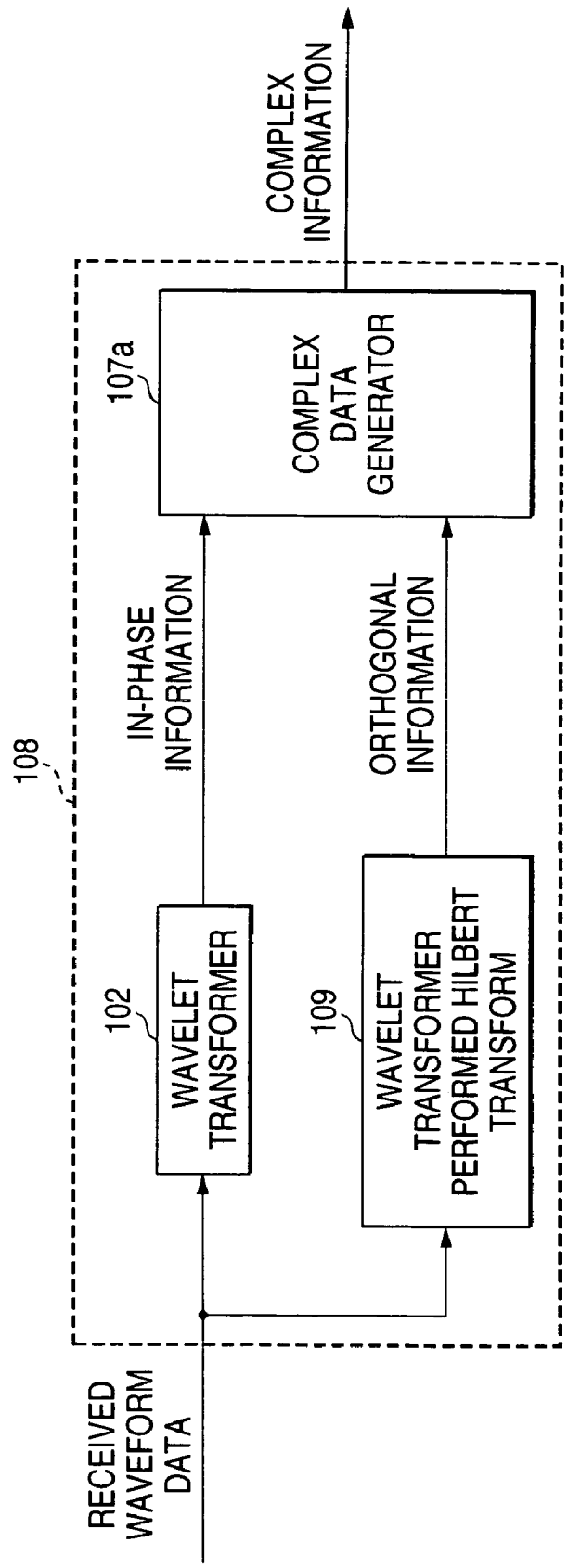
FIG. 2 is a block diagram of a wave detecting section that forms a part of a receiver of a communication apparatus according to a second embodiment of the invention.

FIG. 2 is a block diagram of a wave detecting section that forms a part of a receiver of a communication apparatus according to a second embodiment of the invention. A transmitter of the same is identical to the transmitter 299 in FIG. 14 in configuration.

In FIG. 2, reference numeral "108" represents a wave detecting section of a receiving unit; reference numeral "109" represents a wavelet transformer for performing a Hilbert transform, a wavelet transform, and a process of inverting codes in odd-numbered places on waveform data that have been received at a time; and reference numeral "107a" represents a complex data generator for generating complex data having a real part data (I components) which is outputs from the wavelet transformer 102 and an imaginary part data (Q components) which is outputs from the wavelet transformer 109.

The apparatus operates substantially the same as the first embodiment, the only difference being the fact that the Hilbert transform, the wavelet transform, and the code inverting process that are performed one after another in the first embodiment are performed at a time in the present embodiment.

Such a configuration allows faster processing than the configuration described in the first embodiment and also allows simpler circuitry.

Third Embodiment

Figure 3:
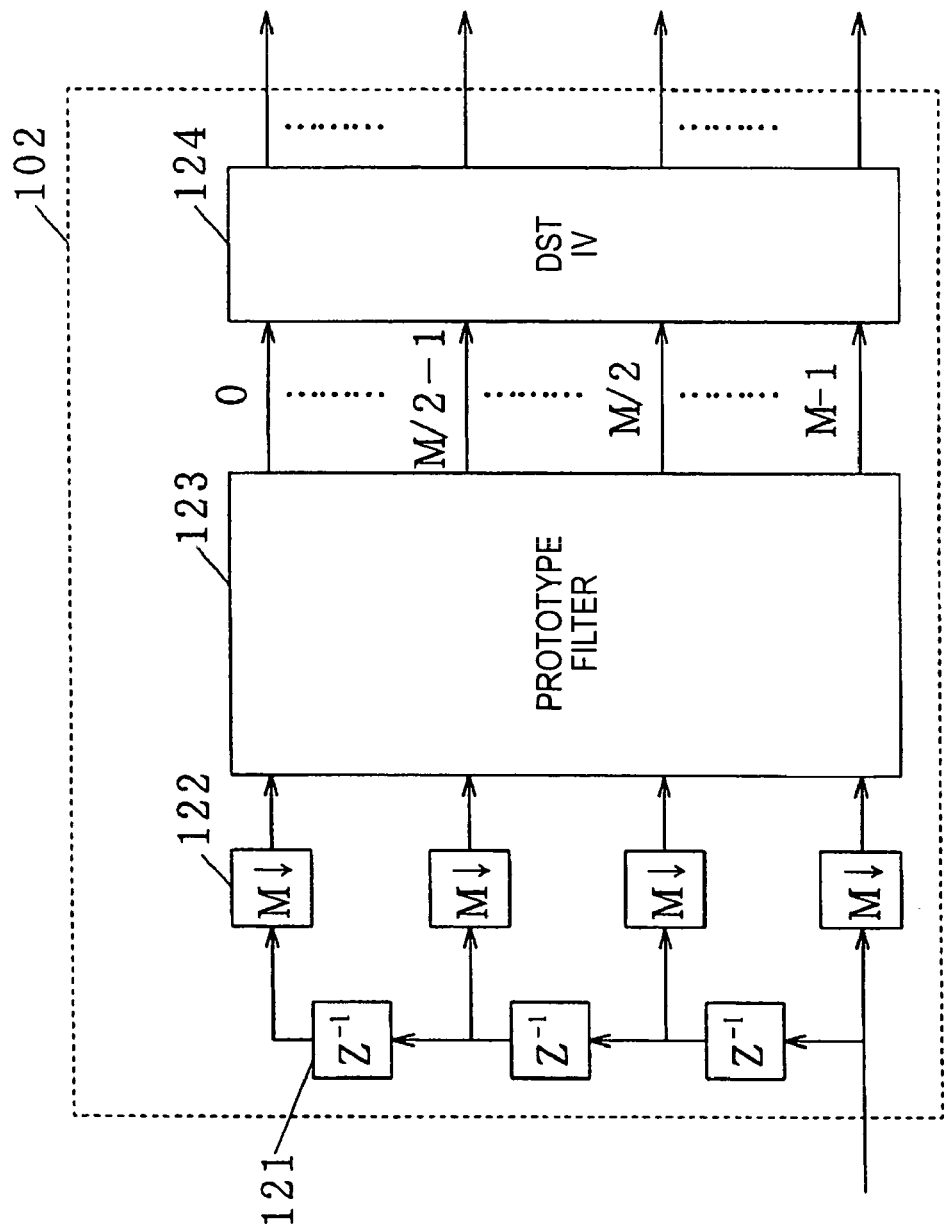
FIG. 3 is a block diagram of a wavelet transformer that forms a part of the wave detecting sections in FIGS. 1 and 2.
Figure 4:
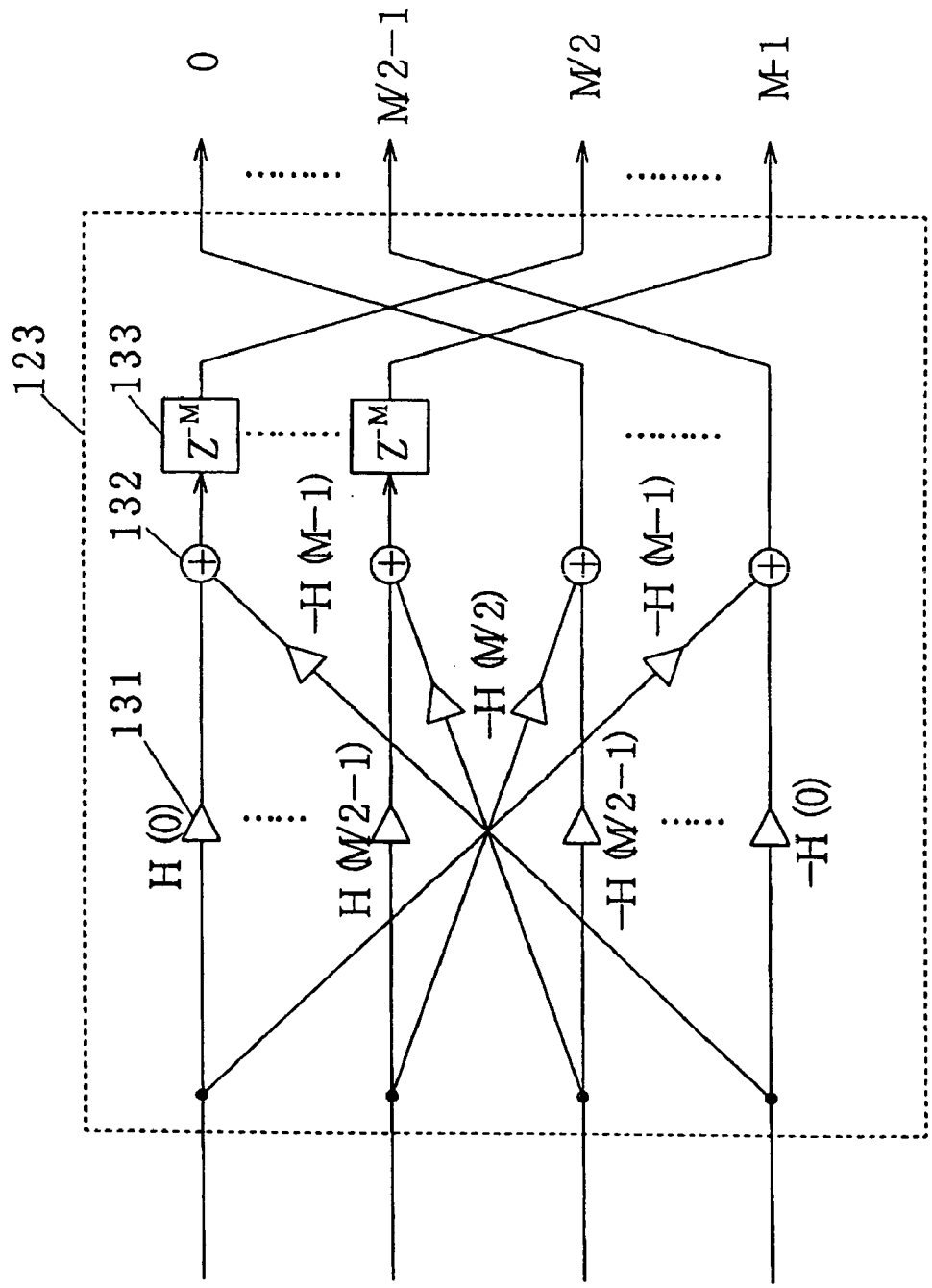
FIG. 4 is a block diagram showing a configuration of the prototype filter having a polyphase configuration in FIG. 3.
Figure 5:
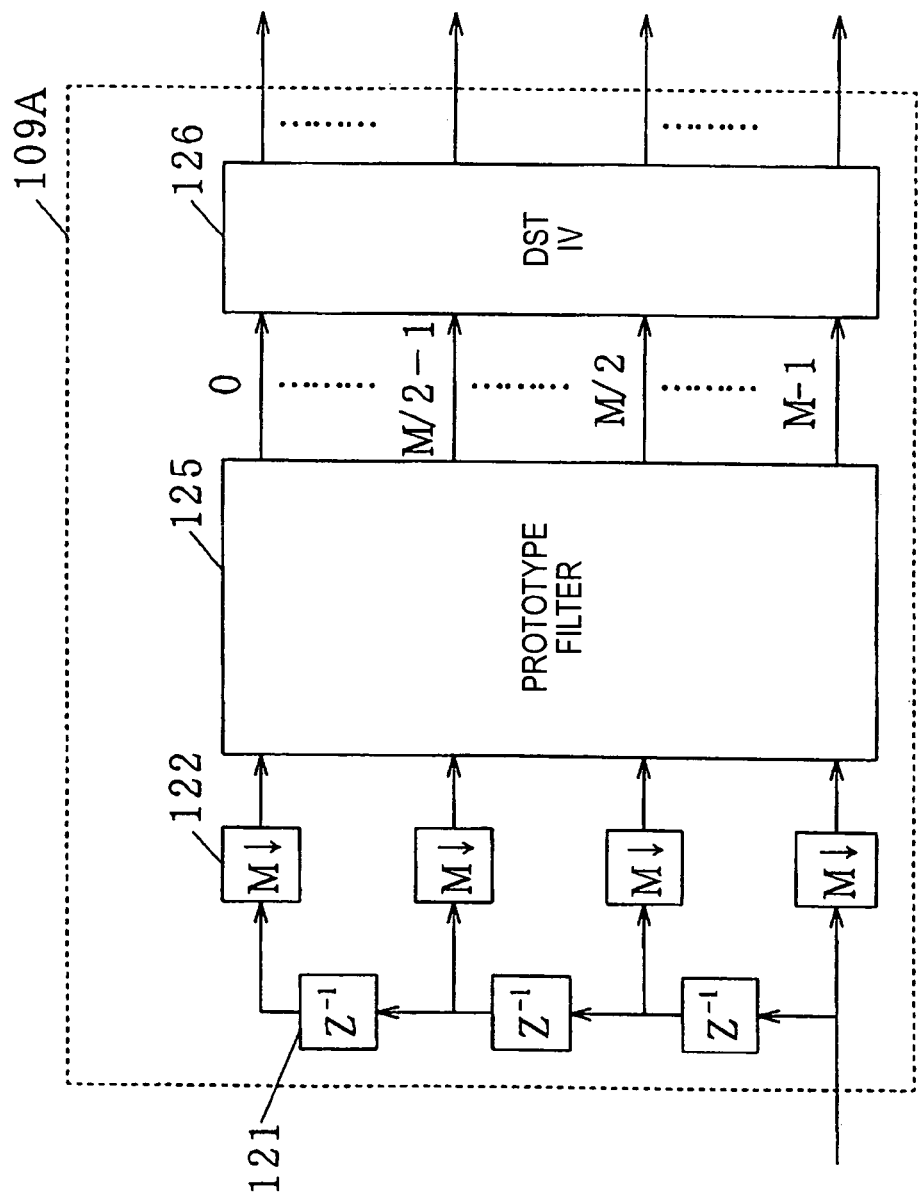
FIG. 5 is a block diagram of a wavelet transformer in FIG. 1.
Figure 6:
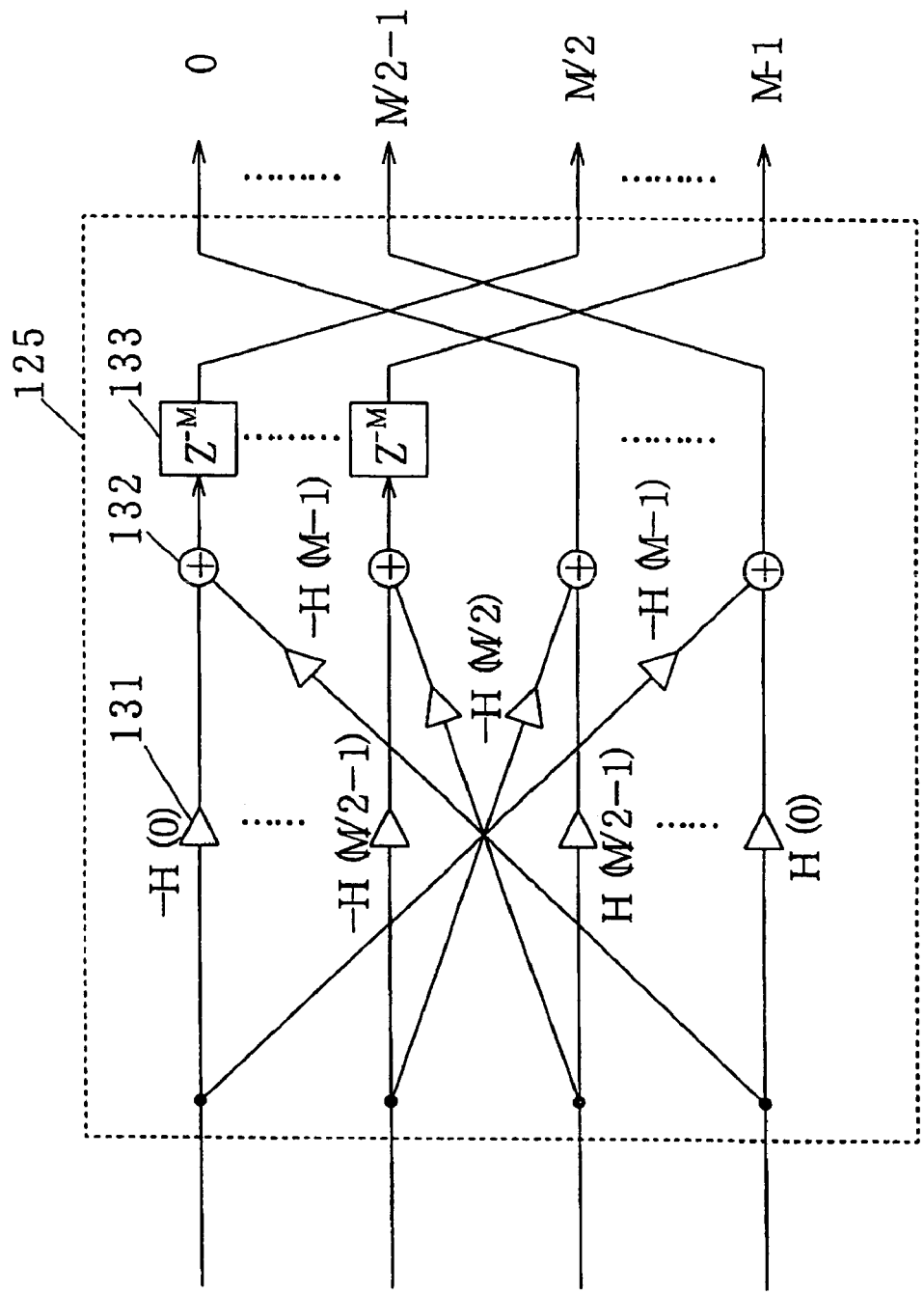
FIG. 6 is a block diagram showing a configuration of the prototype filter having a polyphase configuration in FIG. 5.

FIG. 3 is a block diagram of the wavelet transformer 102 that forms a part of the wave detecting sections in FIGS. 1 and 2. FIG. 4 is a block diagram showing a configuration of the prototype filter having a polyphase configuration in FIG. 3. FIG. 5 is a block diagram of the wavelet transformer in FIG. 1. FIG. 6 is a block diagram showing a configuration of the prototype filter having a polyphase configuration in FIG. 5.

In FIG. 3, reference numeral "102" represents a wavelet transformer as shown in FIG. 1 or 2; reference numeral "121" represents delay elements for delaying waveform data received by one sampling period; reference numeral "122" represents down samplers for reducing the sampling rate for the received waveform data by a factor of M; reference numeral "123" represents a prototype filter; and reference numeral "124" represents a fast discrete cosine transformer (TYPE 4). In FIG. 3, the quantities of the delay elements 121 and the down samplers 122 used are M−1 and M, respectively.

In FIG. 4, reference numeral "123" represents the prototype filter shown in FIG. 3; reference numeral "131" represents multipliers having the same filter coefficient as that of the prototype filter; reference numeral "132" represents two-input adders; and reference numeral "133" represents delay elements for introducing a delay for one symbol period (M sampling periods). The order of the prototype filter 123 shown in FIG. 4 is 2M.

In FIG. 5, reference numeral "109A" represents a wavelet transformer having the same function as that of the wavelet transformer 109 in FIG. 2; reference numeral "121" represents delay elements for delaying waveform data received by one sampling period; reference numeral "122" represents down samplers for reducing the sampling rate of the received waveform data by a factor of M; reference numeral "125" represents a prototype filter; and reference numeral "126" represents a fast discrete sine transformer (TYPE 4). The quantities of the delay elements 121 and the down samplers 122 are M−1 and M, respectively.

In FIG. 6, reference numeral "125" represents the prototype filter shown in FIG. 5; reference numeral "131" represents a multiplier having the same filter coefficient as that of the prototype filter; reference numeral "132" represents a two-input adder; and reference numeral "133" represents delay elements for introducing a delay of one symbol period (M sampling periods). The order of the prototype filter shown in FIG. 6 is 2M.

The apparatus is the same as the second embodiment in operation and different from the same in that the part constituted by FIR filters in the second embodiment is replaced by the prototype filter having a polyphase configuration in combination with the use of a discrete cosine transform or discrete sine transform in the present embodiment.

While the first wavelet transformer (the wavelet transformer 102) and the second wavelet transformer (the wavelet transformer 109A) of the present embodiment are configured as completely separate elements, they may share the same circuitry. Obviously, this is possible because the prototype filters of the transformers have filter coefficients that are merely inverted from each other and because a discrete cosine transform and a discrete sine transform are different only in that the processes use different coefficients.

The above-described configuration allows faster processing than the configuration described in the second embodiment because the polyphase configuration involves a smaller amount of calculation than that in the FIR filter configuration.

Fourth Embodiment

Figure 7:
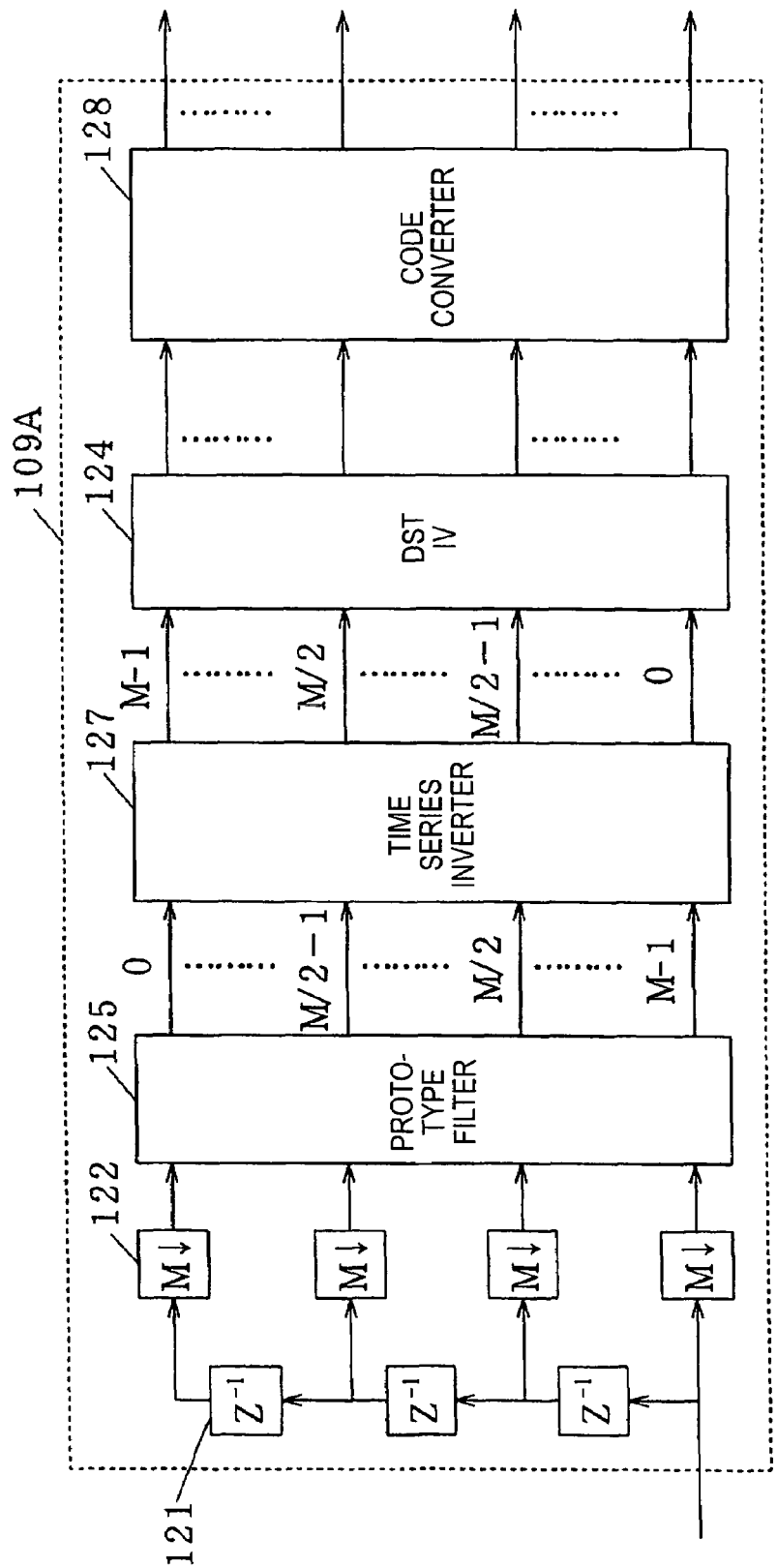
FIG. 7 is a block diagram of another wavelet transformer (a second wavelet transformer) in FIG. 1.

FIG. 7 is a block diagram of a wavelet transformer (the second wavelet transformer) in FIG. 1.

In FIG. 7, reference numeral "109A" represents a wavelet transformer having the same function as that of the wavelet transformer 109 in FIG. 5; reference numeral "121" represents delay elements for delaying waveform data that have been received by one sampling period; reference numeral "122" represents down samplers for reducing the sampling rate of the received waveform data by a factor of M; reference numeral "125" represents a prototype filter; reference numeral "127" represents a time series inverter for inverting the time sequence of every M samples in a series of inputs; reference numeral "124" represents a fast discrete cosine transformer (TYPE 4); and reference numeral "128" represents a code converter for inverting codes in odd-numbered places of the input data. In FIG. 5, the quantities of the delay elements 121 and the down samplers 122 are M−1 and M, respectively.

The apparatus is the same as the third embodiment in operation and different from the same in that the part constituted by the discrete sine transformer 128 in the third embodiment is replaced by the time series inverter 127, the discrete cosine transformer 124, and the code converter 128 in the present embodiment. While the present embodiment has a configuration in which the time series inverter 127 is provided before the discrete cosine transformer 124 and in which the code converter 128 is provided after the discrete cosine transformer 124, the time series inerter 127 and the code converter 128 may be transposed with the same results.

The above-described configuration allows faster processing than the configuration shown in the second embodiment. Since the part constituted by the discrete cosine transformer 124 and the discrete sine transformer 126 in the third embodiment can be constituted only by the discrete cosine transformer 124, circuit sharing is allowed to achieve a smaller circuit scale.

Fifth Embodiment

Figure 8:
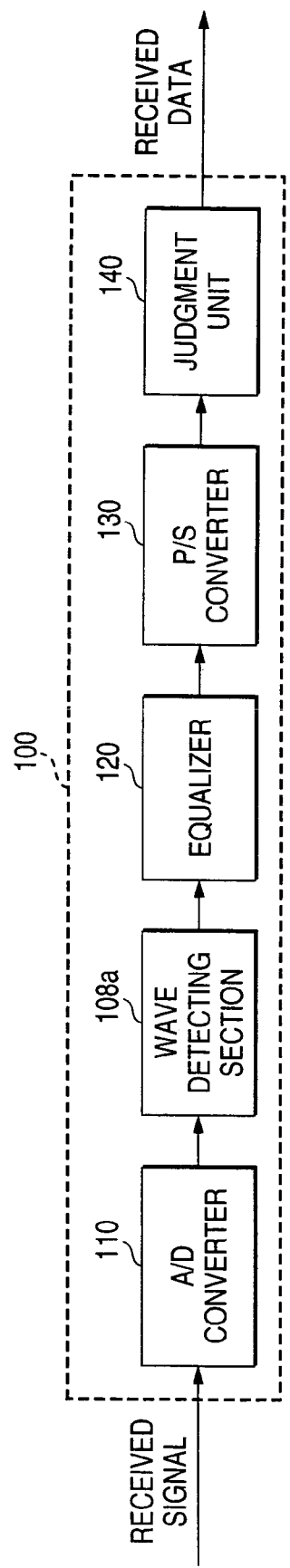
FIG. 8 is a block diagram of a receiver that forms a part of a communication apparatus according to a fifth embodiment of the invention.

FIG. 8 is a block diagram of a receiver that forms a part of a communication apparatus according to a fifth, embodiment of the invention. A transmitter of the same is identical to that in FIG. 14.

In FIG. 8, reference numeral "100" represents the receiver; reference numeral "110" represents an A/D converter; reference numeral "108*a*" represents a wave detecting section similar in configuration to that shown in FIG. 1 or 2; reference numeral "120" represents an equalizer; reference numeral "130" represents a parallel-to-serial converter (P/S converter); and reference numeral "140" represents a judgment unit.

An operation of the receiver having such a configuration will now be described.

At the receiver 100, the A/D converter 110 performs digital conversion on a signal that has been received to obtain received waveform data. The wave detecting section 108*a* detects the received waveform data and obtains complex information on a plurality of subcarriers included in the received signal as its output. Next, the equalizer 120 obtains equalizing quantities by comparing the complex information obtained from the wave detecting section 108*a* with known data that are allocated in advance for the purpose of equalization. The complex information is equalized using the equalizing quantities thus obtained in the interval of actual data transmission symbols and supplied to the parallel-to-serial converter 130. Finally, the judgment unit 140 judges the data based on the equalized complex information. This is a series of operations performed in the receiver 100. The equalizer 120 obtains deviations of the amplitude and phase of each subcarrier from a known signal as equalizing quantities. An adaptive filter (LMS or RLS filter) utilizing a plurality of taps may be used depending on transmission paths.

The above-described configuration allows accurate demodulation even in a transmission path in a bad condition.

The equalizer 120 of the present embodiment may be used in the manner described below.

Figure 19:
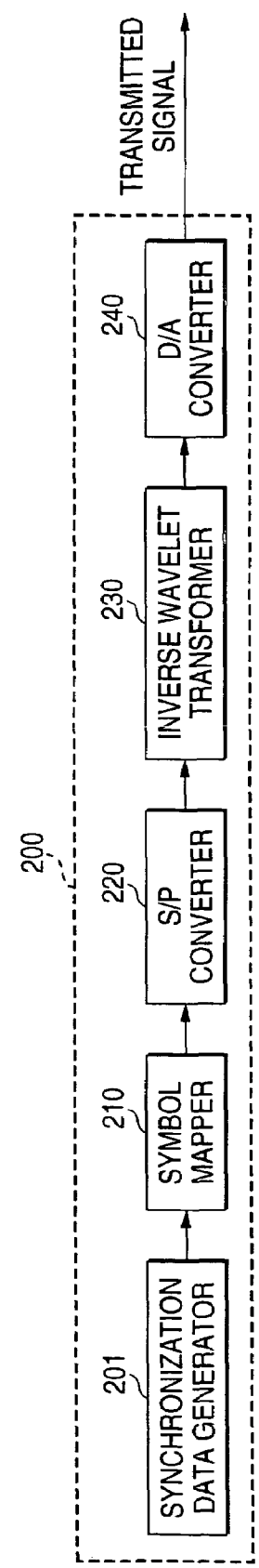
FIG. 19 is a block diagram of a transmitter that forms a part of the communication apparatus according to the fifth embodiment of the invention.

FIG. 19 is a block diagram of the transmitter that forms a part of the communication apparatus according to the fifth embodiment of the invention.

In FIG. 19, reference numeral "200" represents the transmitter; reference numeral "201" represents a synchronization data generator for generating the same data for each of subcarriers for the duration of several consecutive symbols; reference numeral "210" represents a symbol mapper for performing symbol mapping (PAM modulation) according to the synchronization data; reference numeral "230" represents an inverse wavelet transformer; reference numeral "220" represents a serial-to-parallel (S/P) converter for performing serial conversion of outputs from the inverse wavelet transformer; reference numeral "240" represents a D/A converter for converting waveform data to be transmitted output by the serial-to-parallel converter 220.

Figure 10:
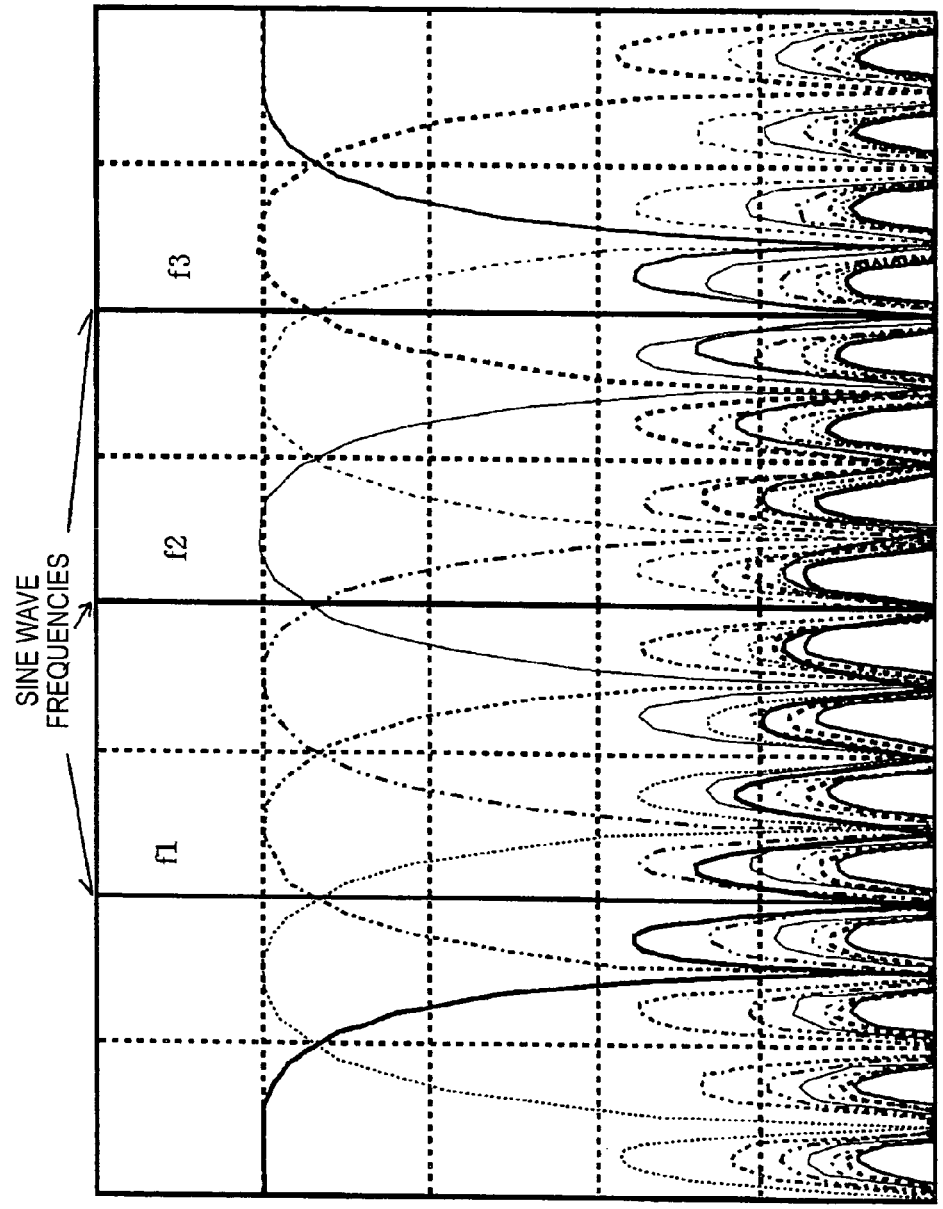
FIG. 10 is a graph showing a relationship between subcarriers and sine wave frequencies.

An operation of the communication apparatus having such a configuration will be described with reference to FIG. 10. FIG. 10 is a graph showing a relationship between subcarriers and sine wave frequencies. For simplicity of description, it is assumed that eight wavelet transforms, i.e., eight subcarriers are used.

At the transmitter 200, the synchronization data generator 201 first outputs the same data (e.g., 1) for each of the subcarriers to the symbol mapper 210 for the duration of several consecutive symbols. The data allocated to each subcarrier at this time are data that are known to the receiver 100. The data are then transformed by the inverse wavelet transformer 230. At this time, the inverse wavelet transformer 230 outputs a composite wave originating from sine waves having frequencies "fn" as shown in FIG. 10. The composite wave data are converted by the serial-to-parallel converter 220 and the D/A converter 240 into an analog signal that is then transmitted.

At the receiver 100, the A/D converter 100 first performs digital conversion of the received signal to obtain received waveform data. The wave detecting section 108 detects the received waveform data and obtains complex information on the plurality of sine waves included in the received signal as its output. The wave detecting section 108 supplies the complex data (complex information) to the equalizer 120. The equalizer 120 synthesizes (2n−1)-th and 2n-th outputs (1≦n≦(M/2−1), the subcarriers being numbered from 0 to M−1) by matching their phases using the complex information obtained from the wave detecting section 108 to obtain an equalization coefficient to be used for each of the subcarriers with high accuracy. Equalizing quantities are determined using the equalization coefficients thus obtained and known data that are allocated in advance for the purpose of equalization. This method can be carried out because the equalization coefficients are obtained using the same sine waves for the (2n−1)-th and 2n-th subcarriers. The complex data are then equalized using equalizing quantities thus obtained in the interval of actual data transmission symbols and are supplied to the parallel-to-serial converter 130. Finally, the judgment unit 140 judges the data based on the equalized complex data.

In the above-described configuration, since an equalizing quantity can be obtained for each pair of subcarriers, calculations can be performed with accuracy higher than that achieved by determining an equalizing quantity for each subcarrier.

Sixth Embodiment

FIG. 9A is a block diagram of a transmitter that forms a part of a communication apparatus according to a sixth embodiment of the invention, and FIG. 9B is a block diagram of a receiver that forms a part of the communication apparatus according to the sixth embodiment of the invention.

A receiver 100, A/D converter 110, a wave detecting section 108*a*, an equalizer 120, a P/S converter 130, and a judgment unit 140 in FIG. 9B are similar to those in FIG. 8, and they are indicated by line reference numerals and will not be described here. In FIG. 9B, reference numeral "141" represents a delay circuit for introducing a delay of one sampling period; reference numeral "142" is a complex divider; reference numeral "143" represents a complex adder for cumulatively adding complex data input thereto; reference numeral "144" represents a synchronization shift calculator; and reference numeral "145" represents a synchronization timing estimation circuit. In FIG. 9A, reference numeral "200" represents the transmitter; reference numeral "201" represents a synchronization data generator for generating the same data for each subcarrier for the duration of several consecutive symbols; reference numeral "210" represents a symbol mapper for performing symbol mapping (PAM modulation) according to the synchronization data; reference numeral "230" represents an inverse wavelet transformer; reference numeral "220" represents a serial-to-parallel converter (S/P converter) for performing serial conversion of outputs from the inverse wavelet transformer; and reference numeral "240" represents a D/A converter for converting waveform data to be transmitted output by the serial-to-parallel converter 220 into an analog signal.

An operation of the communication apparatus having such a configuration will be described with reference to FIG. 10. FIG. 10 is a graph showing a relationship between subcarriers and sine wave frequencies. For simplicity of description, it is assumed that eight wavelet transforms, i.e., eight subcarriers are used.

At the receiver 200, the synchronization data generator 201 first outputs the same data (e.g., 1) for each of the subcarriers to the symbol mapper 210 for the duration of several consecutive symbols. The data allocated to each of the subcarriers at this time are data that are known to the receiver 100. The data are transformed by the inverse wavelet transformer 230. At this time, the inverse wavelet transformer 230 outputs a composite wave originating from sine waves having frequencies "fn" as shown in FIG. 10. The composite wave data are converted by the serial-to-parallel converter 220 and the D/A converter 240 into an analog signal that is then transmitted.

At the receiver 100, the D/A converter 110 first performs digital conversion of the received signal to obtain received waveform data. The wave detecting section 108a detects the received waveform data and obtains complex information on the plurality of sine waves included in the received signal as its output. At this time, the values of all outputs from the wave detecting section 108a are equal when the symbols are synchronized at accurate timing. When there is mistiming of synchronization, the outputs are at values that reflect phase rotations represented by "2πfc·τ" depending on the degrees "τ" of the shifts and the subcarrier frequencies "fc". Next, the delay circuit 141 and the complex divider 142 perform complex division between adjacent subcarriers to calculate phase differences on the complex coordinates. Since frequency intervals "fi" between pairs of adjacent subcarriers are all equal, all of the phase differences (complex values) have the same value of "2πfi·τ" (in practice, their values deviate from "2πfi·τ" under the influence of the transmission path). The phase differences "θc" between the subcarriers are cumulatively added by the complex adder 143 to obtain an average value "θm", and the synchronization shift calculator 144 obtains synchronization shifts "τm" from the subcarrier intervals "fi" and the average subcarrier phase difference "θm". The results are supplied to the synchronization timing estimation circuit 145 to provide feedback of the timing of synchronization to the wave detecting section 108a. The average subcarrier phase difference is subtracted from each subcarrier phase difference (θc-θm) to obtain a new parameter "c" (subcarrier phase difference number) with which the synchronization shift calculator 144 identifies a difference "τc" between the synchronization timing of each subcarrier and average synchronization timing to calculate the shift of synchronization timing of each subcarrier from the average synchronization timing. The synchronization timing of each subcarrier is subjected to fine adjustment using the difference "τc". The fine adjustment is required because the timing of synchronization of each subcarrier is shifted under the influence of the transmission path and must be adjusted to the average value. However, since the average value does not represent perfect synchronization of each subcarrier, any shift of the synchronization timing of each subcarrier from the average synchronization timing is identified, and the synchronization timing of each subcarrier is fine-adjusted according to the amount of the shift. The above-described operation makes it possible to correct any shift of signal points between the received and known signals (of the synchronization data) attributable to a shift of the synchronization timing of each subcarrier. This allows the performance of subsequent equalization and, consequently, receiving performance to be improved.

After the timing of synchronization is established, the wave detecting section 108a supplies the complex data (complex information) to the equalizer 120. The equalizer 120 compares the complex data provided by the wave detecting section 108a and the known data that are allocated in advance for the purpose of equalization (synchronization) to obtain equalizing quantities. The complex data are equalized using the equalizing quantities thus obtained in the interval of actual data transmission symbols and are supplied to the parallel-to-serial converter 130. Finally, the judgment unit 140 judges the data based on the equalized complex data.

With the above-described configuration, since the timing of synchronization can be estimated with high accuracy even for a transmission path in a bad condition, demodulation can be performed with high accuracy.

Referring to the values determined by the wave detecting section 108a, quantities of phase rotation can be determined with high accuracy by synthesizing the (2n−1)-th and 2n-th outputs (1≦n≦(M/2−1), the subcarriers being numbered from 0 to M−1) while matching their phases. This method can be carried out because the quantities of phase rotation of the (2n−1)-th and 2n-th subcarriers are determined using the same sine wave, as shown in FIG. 10.

With the above-described configuration, since the quantity of a phase rotation attributable to mistiming of synchronization can be determined for each pair of subcarriers, calculations can be performed with accuracy higher than that achievable in determining the quantity of a phase rotation for each subcarrier.

Seventh Embodiment

Figure 11:
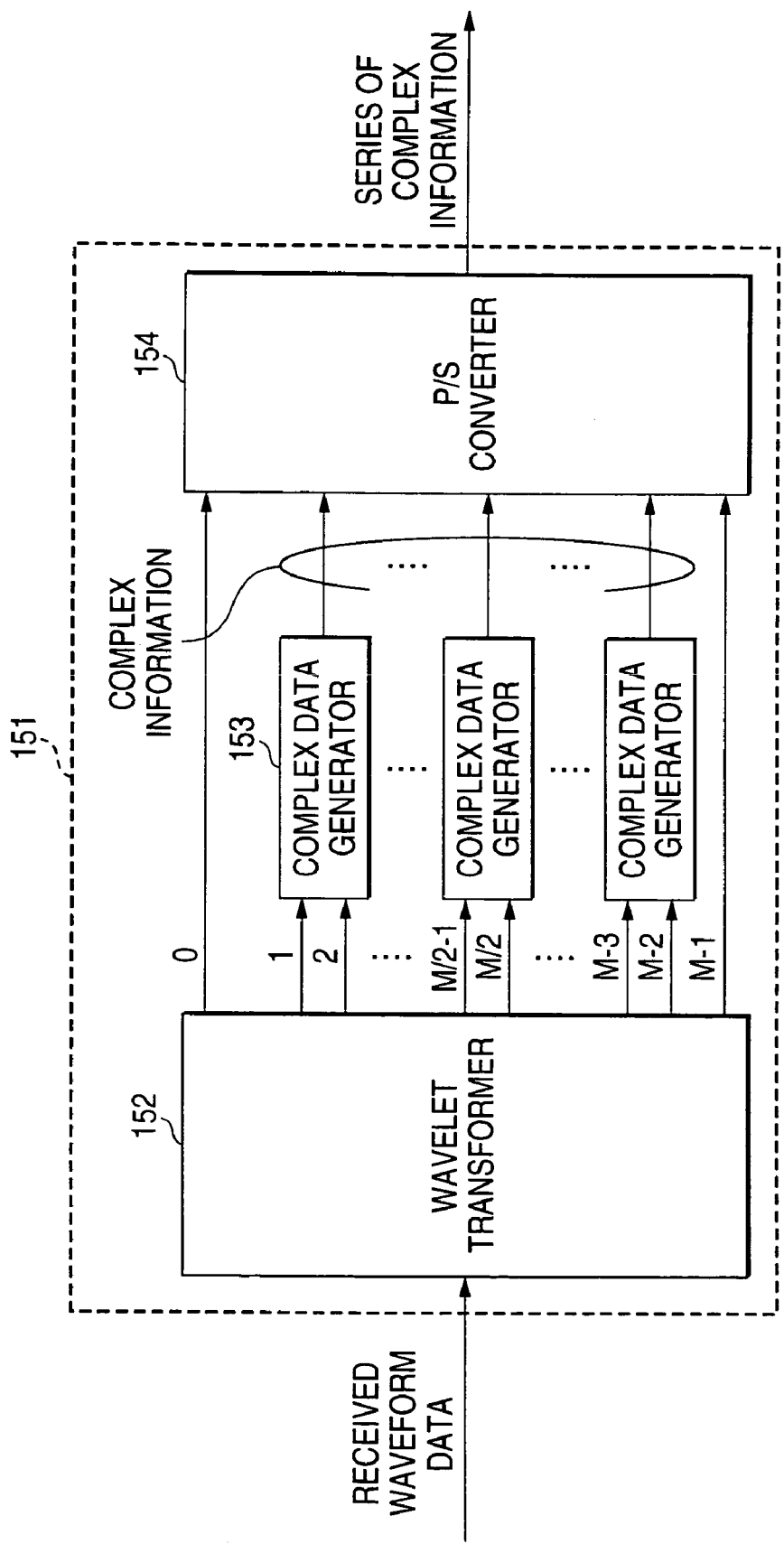
FIG. 11 is a block diagram of a wave detecting section that forms a part of a receiver of a communication apparatus according to a seventh embodiment of the invention.
Figure 14:
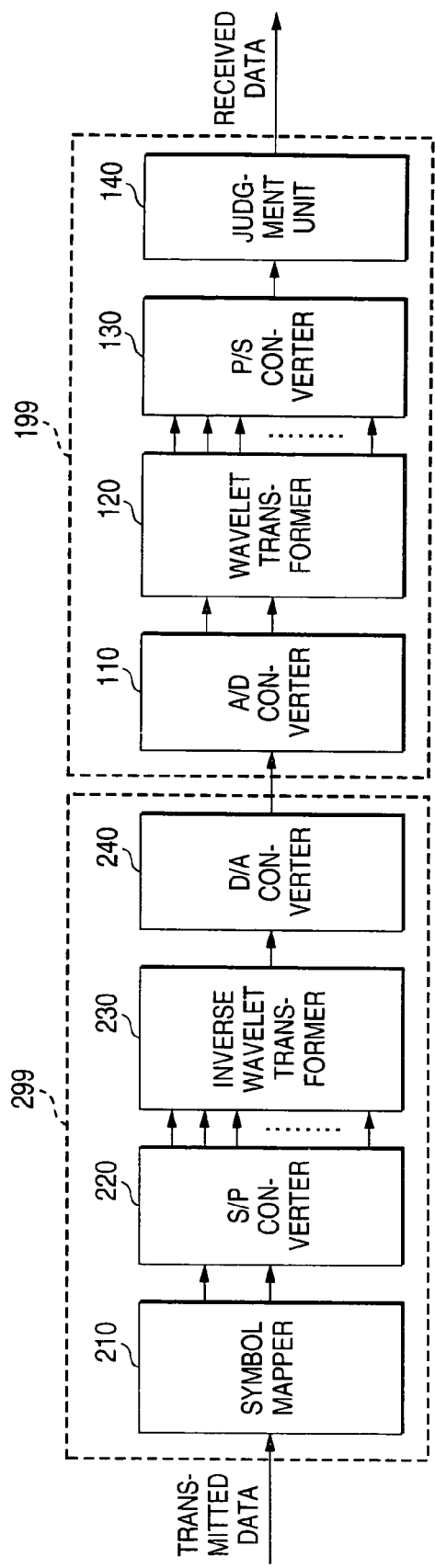
FIG. 14 is a block diagram of a communication apparatus according to the related art constituted by a transmitter and a receiver employing the DWMC transmission method.
Figure 15:
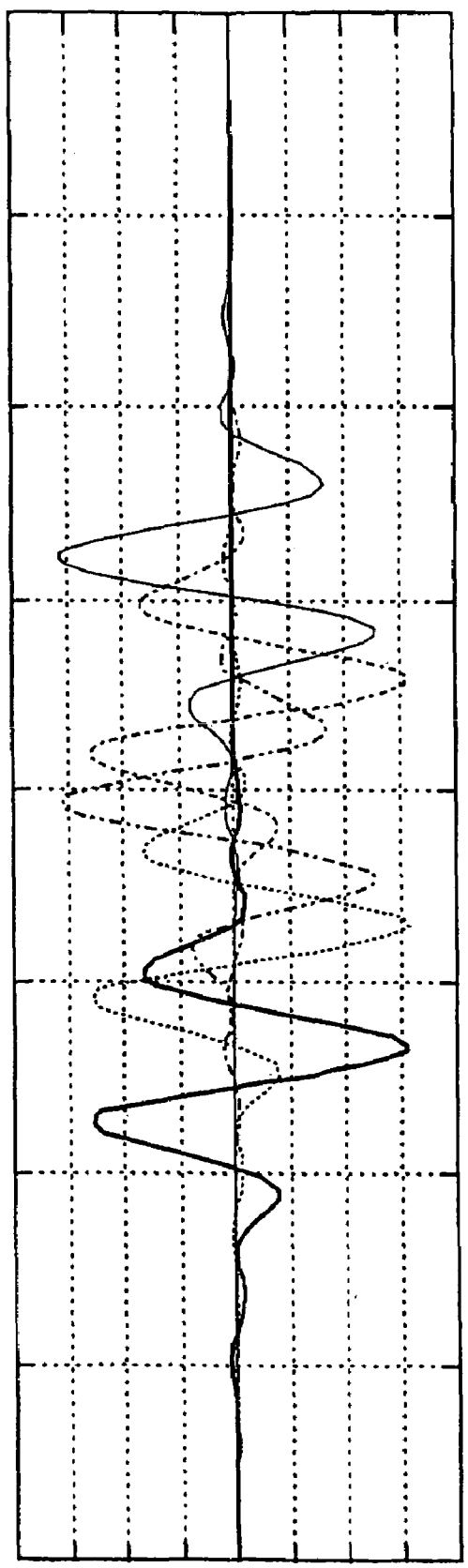
FIG. 15 is a waveform diagram showing an example of a wavelet waveform.
Figure 16:
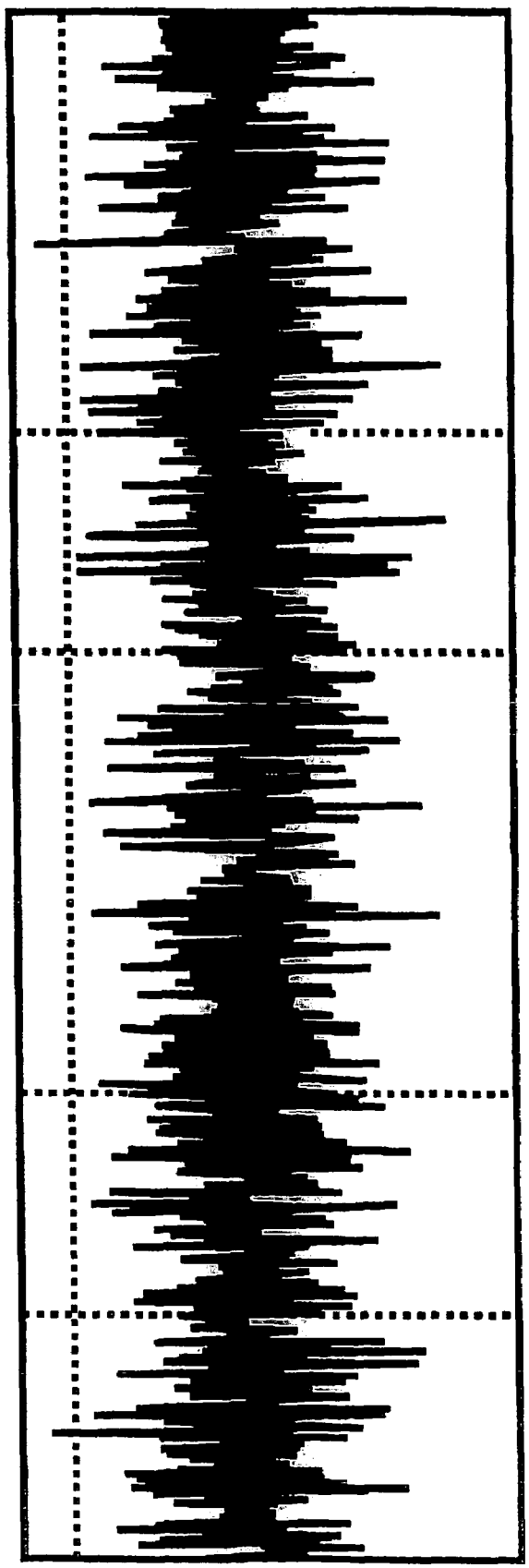
FIG. 16 is a waveform diagram showing an example of a transmission waveform according to the DWMC transmission method.
Figure 17:
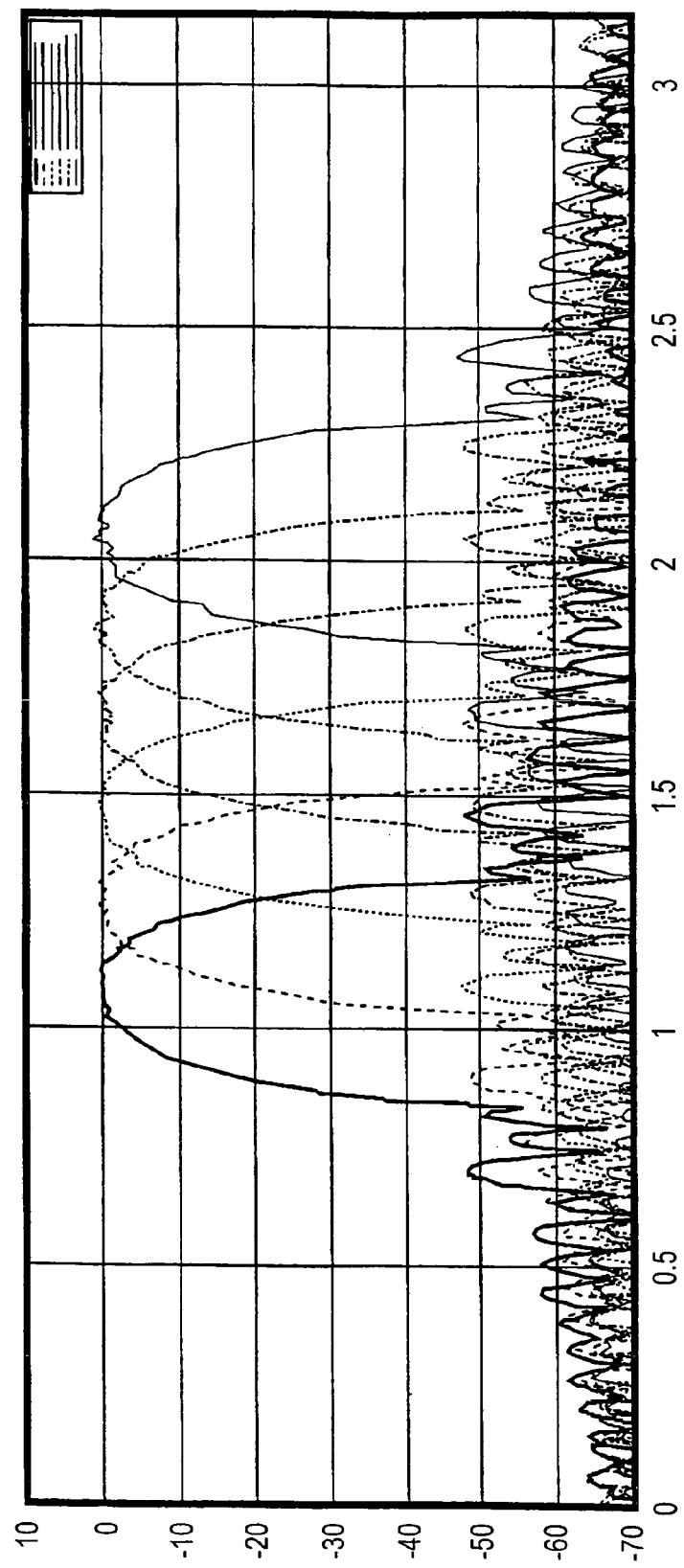
FIG. 17 is a spectrum diagram showing an example of a transmission spectrum according to the DWMC transmission method.

FIG. 11 is a block diagram of a wave detecting section that forms a part of a receiver of a communication apparatus according to a seventh embodiment of the invention. A transmitter of the same is identical to that shown in FIG. 9B.

In FIG. 11, reference numeral "151" represents the wave detecting section of the receiver; reference numeral "152" represents a wavelet transformer constituted by M real coefficient wavelet filters that are orthogonal to each other; reference numeral "153" represents complex data generators for generating complex data, in-phase components (I channel) of the complex information being (2n−1)-th outputs from the wavelet transformer 152 and orthogonal components (Q channel) of the same being 2n-th outputs from the same (1≦n≦(M/2)); and reference numeral "154" represents a parallel-to-serial converter (P/S converter) for performing serial conversion of the complex data that are serially output.

An operation of the wave detecting section 151 having such a configuration will be described with reference to FIG. 10. For simplicity, the description will be made on an assumption that there are eight subcarriers. In the present embodiment, it is assumed that a composite wave originating from sine waves having frequencies indicated by the bold solid lines (f1, f2, and f3) in FIG. 10 is input to the receiver and that the sine waves have phases φ1, φ2, and φ3, respectively. At this time, each sine wave is in an arbitrary phase "φn" (n=1, 2, or 3) in the range from −π to π.

The wave detecting section 151 performs a wavelet transform of waveform data that have been received with the wavelet transformer 152. At this time, (2n−1)-th and 2n-th subcarrier outputs (1≦n≦(M/2−1), the subcarriers being numbered from 0 to M−1) are cos(φn) and sin(φn), respectively, of sine waves having frequencies fn in FIG. 10. The complex data generators 153 generate complex data including real part data that is constituted by the cos(φn) and imaginary part data that is constituted by the sin(φn). Finally, the parallel-to-serial converter 154 obtains serial complex data.

While the present embodiment employs (M/2−1) complex data generators 153, it can be carried out using a single complex data generator by performing parallel-to-serial conversion of outputs from the wavelet transformer 152 and performing timing control such that (2n−1)-th and 2n-th items of the serial data are input to the complex data generator 153.

The above-described configuration makes it possible to obtain complex information (complex data) with a smaller amount of calculation (about one half of that in the third embodiment), although it is limited to a received signal constituted by sine waves.

Eighth Embodiment

FIG. 12 is a block diagram of a modulator that forms a part of a transmitter of a communication apparatus according to an eighth embodiment of the invention.

In FIG. 12, reference numeral "251" represents the modulator; reference numeral "252" represents a symbol mapper for converting bit data into symbol data to perform symbol mapping (QAM modulation) according to each item of the symbol data; reference numeral "253" represents a serial-to-parallel converter (S/P converter) for performing parallel conversion of items of data input thereto one after another; reference numeral "254" represents complex data decomposers for decomposing complex data input thereto into a real part and an imaginary part; and reference numeral "255" represents an inverse wavelet transformer.

An operation of the modulator 251 of the transmitter having such a configuration will be described with reference to FIG. 10. For simplicity, the description will be made on an assumption that there are eight subcarriers. In the present embodiment, it is assumed that the transmitter outputs a composite wave originating from sine waves having frequencies indicated by the bold solid lines (f1, f2, and f3) in FIG. 10 and that the sine waves have phases φ1, φ2, and φ3, respectively. At this time, each sine wave is in an arbitrary phase "φn" (n=1, 2, or 3) in the range from −π to π.

First, the modulator 251 converts data to be transmitted (bit data) into symbol data with the symbol mapper 252, and QAM modulation is performed according to the symbol data to provide signal points on complex coordinates. The following equation 1 is obtained from this process.

$$e^{j\phi n} \quad \text{Equation 1}$$

Next, the data are converted by the serial-to-parallel converter 253 into parallel complex data, and each item of the complex data is decomposed by the complex data decomposer 254 into real part data (cos(φn)) and imaginary part data (sin (φn)). The cos(φn) and sin(φn) are respectively allocated to (2n−1)-th and 2n-th inputs to the inverse wavelet transformer 255 (1≦n≦(M/2−1)). Then, the inverse wavelet transformer 255 outputs a composite wave originating from sine waves having frequencies fn as shown in FIG. 10 and initial phases φn and cos(2πfn·t+φn).

While the present embodiment employs M/2−1 complex data decomposers in total, it can be carried out using only one complex data decomposer.

In the above-described configuration, since an initial phase on a complex coordinate plane provided by the symbol mapper 252 can be freely assigned to each of the subcarriers (to be exact, each of pairs consisting of (2n−1)-th and 2n-th subcarriers), an instantaneous peak voltage at the transmission of an output can be suppressed by setting the data such that the phases of the subcarriers do not overlap.

Ninth Embodiment

FIG. 13A is a block diagram of a transmitter that forms a part of a communication apparatus according to a ninth embodiment of the invention, and FIG. 13B is a block diagram of a receiver of the communication apparatus according to the ninth embodiment of the invention.

In FIG. 13B, reference numeral "150" represents the receiver; reference numeral "110" represents an A/D converter for converting a signal that has been received into a digital signal; reference numeral "151" represents a wave detecting section as shown in FIG. 11; reference numeral "146" represents a phase rotator for rotating a phase on a complex plane; reference numeral "141" represents a delay circuit for introducing a delay of one sampling period; reference numeral "142" represents a complex divider; reference numeral "143" represents a complex adder for cumulatively adding complex data input thereto; reference numeral "144" represents a synchronization shift calculator; and reference numeral "145" represents a synchronization timing estimation circuit. In FIG. 13A, reference numeral "250" represents the transmitter; reference numeral "256" represents a synchronization data generator for generating the same data for each subcarrier for the duration of several consecutive symbols; reference numeral "251" represents a modulator as shown in FIG. 12; and reference numeral "240" represents a D/A converter for converting waveform data to be transmitted generated by the modulator 251 into an analog signal.

Operations of the transmitter 250 and the receiver 150 of the communication apparatus having such a configuration will be described with reference to FIG. 10. It is assumed that eight wavelet transforms, i.e., eight subcarriers are used.

At the transmitter 250, the synchronization data generator 256 first outputs the same data for each subcarrier to the modulator 251 for the duration of several consecutive symbols. The data allocated to each subcarrier are data that are known to the receiver 150. The synchronization data are modulated by the modulator 251. At this time, the modulator 251 outputs a composite wave originating from sine waves having frequencies fn as shown in FIG. 10. The phase of each of the sine waves depends on the input synchronization data, and the phase is represented by φn here. Finally, the composite wave data are converted by the D/A converter 240 into an analog signal that is then transmitted.

At the receiver 150, the D/A converter 110 first performs digital conversion of the signal thus received to obtain received waveform data. The wave detecting section 151 detects the received waveform data to obtain complex signal point information on each of the plurality of sine waves included in the received signal. Since the complex signal point information thus obtained has phases that have been rotated by "φn", the phase rotator 146 returns the phases by "φn" on the complex coordinates. The values of all outputs from the phase rotator 146 are equal when the symbols have been synchronized at accurate timing. When the synchronization has been mistimed, the values reflect phase rotations of "2πfc·τ" that depend on degrees "τ" of shifts and subcarrier frequencies "fc". Next, the delay elements 141 and the complex divider 142 perform complex division between adjacent subcarriers to calculate phase differences on the complex coordinates. Since all of the pairs of adjacent subcarriers have the same frequency interval "fi", all subcarrier phase differences (complex values) are at the same value of "2πfi·τ" (in practice, the values deviate from "2πfi·τ" under the influence of the transmission path). The subcarrier phase differences are cumulatively added by the complex adder 143 to obtain an average value "φm", and the synchronization shift calculator 144 determines a synchronization shift value "τ" from the subcarrier frequency interval "fi" and the average subcarrier phase difference "φm". The result is supplied to the synchronization Liming estimation circuit 145 to provide feedback of the synchronization timing to the wave detecting section.

With the above-described configuration, the part constituted by two wavelet transformers in the sixth embodiment can be provided using a single wavelet transformer, which allows a reduction in the scale of the circuit.

Tenth Embodiment

While the invention may be applied to a wide variety of communication apparatus for transmitting and receiving signals, it is suitable for systems for power line communication that may employ a transmission path in a bad condition.

Figure 20:
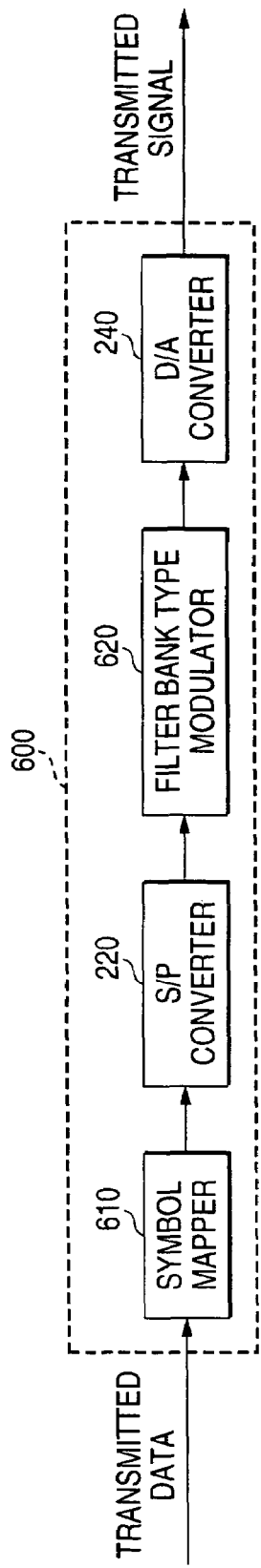
FIG. 20 is a block diagram of a transmitter that forms a part of a communication apparatus according to a tenth embodiment of the invention.

FIG. 20 is a block diagram of a transmitter that forms a part of a communication apparatus according to a tenth embodiment of the invention, and FIG. 20 is a block diagram of a receiver that forms a part of the communication apparatus according to the tenth embodiment of the invention.

In FIG. 20, reference numeral "600" represents a transmitting section; reference numeral "610" represents a symbol mapper for converting bit data into symbol data and mapping the same into a certain arrangement of signal points; reference numeral "220" represents an S/P converter for converting serial data into parallel data; reference numeral "620" represents a modulator utilizing a filter bank involving a plurality M of filters, which are orthogonal with respect to each other for modulating a signal to be transmitted by performing an inverse transform of the same; reference numeral "240" represents a D/A converter for converting a digital signal into an analog signal; reference numeral "700" represents a receiving section; reference numeral "110" represents an A/D converter for converting an analog signal into a digital signal; and reference numeral "630" represents a demodulator utilizing a filter bank involving a plurality M of filters, which are orthogonal with respect to each other for demodulating a received signal by transforming the same.

Figure 21:
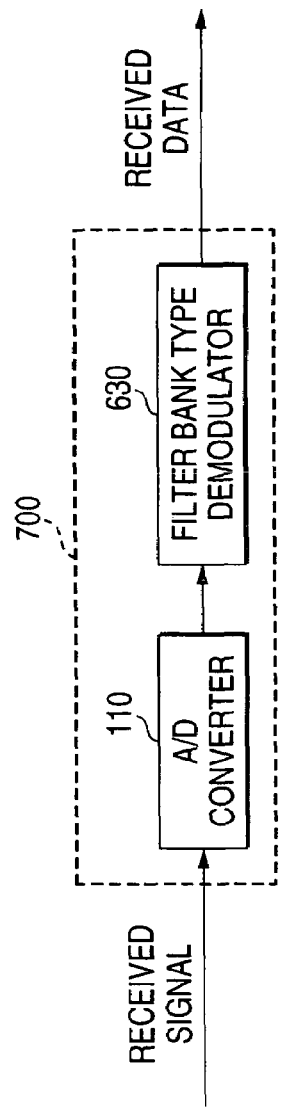
FIG. 21 is a block diagram of a receiver that forms a part of the communication apparatus according to the tenth embodiment of the invention.

An operation of this apparatus will now be described with reference to FIGS. 20 and 21.

At the transmitting section 600 of the transmitter, the symbol mapper 610 converts bit data into symbol data and maps the same according to certain signal point mapping information; the filter bank type modulator 620 modulates the signal to be transmitted which is signal-points-arranged by the symbol mapper 610 by performing an inverse transform of the same; and the D/A converter 240 converts the digital signal into an analog signal. At the wave detecting section 700 of the receiver, the A/D converter 110 converts the analog signal into a digital signal, and the filter bank type demodulator 630 demodulates the received signal by transforming the same.

Filter banks that can be used include wavelet-based cosine transform filter banks and FFT-based pulse shaping type OFDMs. The figure illustrates an amplitude spectrum obtained using a cosine modulation filter bank (having a filter length of 4M). In the figure, notches are formed by disabling subcarriers that overlap amateur radio bands. Multi-carrier transmission using band-limited (pulse shaped) subcarriers can be performed by carrying out modulation and demodulation processes using filter banks as thus described. The use of band-limited multi-carriers allows power line communication to be more resistant to narrow band interference waves and inter-carrier interference. Since the band of each subcarrier is limited, sharp notches can be formed by disabling several subcarriers.

Deregulation is in progress to allow the use of the band from about 2 M to 30M for power line communication. However, other existing systems (e.g., amateur radios and shortwave broadcasts) use the same band. Since no interfere with such other existing systems is allowed, signals should not be transmitted to the band used by other existing systems during power line communication. Normally, a notch filter is generated by a separate filter to disable transmission to the band used by existing systems. A notch filter for 30 dB is used in "HomePlug 1.0" released by HomePlug that is an alliance of power line communication businesses in the United States. Thus, a possible target for the suppression of interference to other existing systems is 30 dB or more.

According to the inventive method, a filter bank is used to limit the band of each subcarrier to disable subcarriers that overlap the band used by existing systems, which makes it possible to achieve the same operation as in the method of the related art (the operation of generating notches in the band used by other existing systems; see the figure) without generating a notch filter. Deeper notches are formed, the greater the filter length of each of the filters of the filter bank (with the number M of the filters fixed). In this case, there is a concern about a delay attributable to the filters (a filter delay is a trade-off for the notch depth). It is therefore possible to form notches of 30 dB or more and to suppress a filter delay by limiting the filter length of a filter bank for power line communication to 4M.

Eleventh Embodiment

Figure 22:
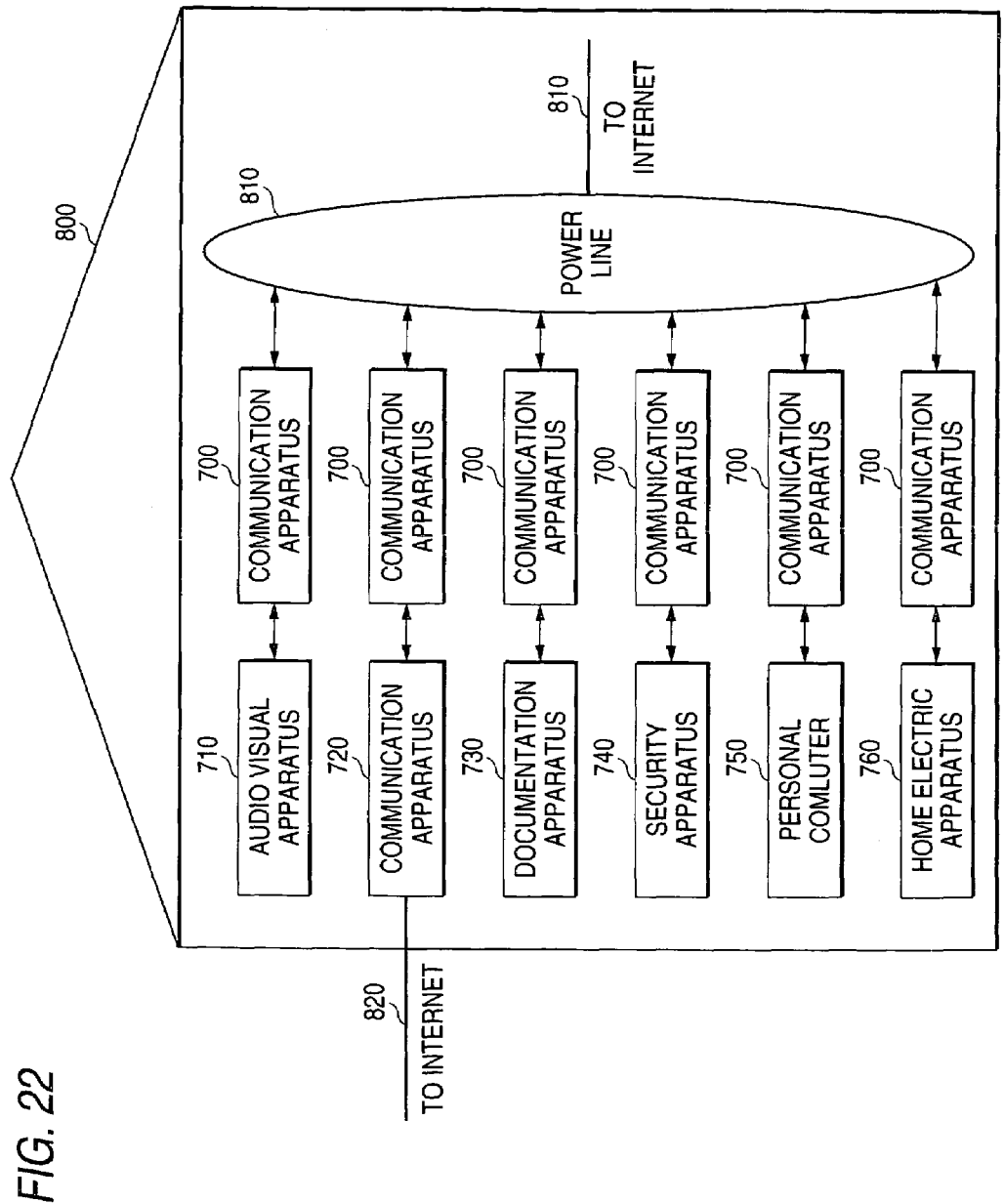
FIG. 22 is a block diagram of a power line communication system according to an eleventh embodiment of the invention.

FIG. 22 is a block diagram of a power line communication system according to an eleventh embodiment of the invention. In the figure, reference numeral "800" represents a building; reference numeral "810" represents a power line; reference numeral "820" represents a telephone network, an optical network, or a CATV network; reference numeral "700" represents communication apparatus utilizing a filter bank involving a plurality M of filters, which are orthogonal with respect to each other according to the invention; reference numeral "710" represents an AV apparatus such as a television set, a video, a DVD, or a DV camera; reference numeral "720" represents a communication apparatus such as a router, an ADSL, a VDSL, a media converter, or a telephone; reference numeral "730" represents a documentation apparatus such as a printer, a facsimile, or a scanner; reference numeral "740" represents a security apparatus such as a camera key or an interphone; reference numeral "750" represents a personal computer; and reference numeral "760" represents a home electrical apparatus such as an air conditioner, a refrigerator, a washing machine, or a microwave oven.

An operation of the present embodiment will be described with reference to FIG. 22. The apparatus form a network through the power line and perform bidirectional communication using the communication apparatus utilizing a filter bank involving a plurality M of filters which are orthogonal with respect to each other. Referring to communication to the internet, a connection may be made via a home gateway provided in the building through the power line. Alternatively, a connection may be made via a communication apparatus that communicates over the telephone network, optical network, or CATV network as a medium. Further alternatively, a connection may be made on a wireless basis from a communication apparatus having a radio function. Since the communication apparatus used here perform modulation and demodulation processes using filter banks involving a plurality M of filters which are orthogonal with respect to each other as described in the tenth embodiment, interference with the other existing systems can be suppressed by disabling subcarriers that overlap the band used by the other existing systems. Further, since the filter length is limited to 4M, delays attributable to the filters can be suppressed while achieving a notch depth of 30 dB or more. On the contrary, the effect of narrow band interferences from the other existing systems can be reduced.

Further, when a notch is to be generated in a certain band, what is required is only to disable any subcarrier that overlaps the band. It is therefore possible to comply with regulations in various countries easily with flexibility. Even when there is a regulation change after the present system is put in use, it can be accommodated with flexibility through an action such as firmware upgrading.

What is claimed is:

1. A communication apparatus employing a multi-carrier transmission method which demodulates data, the communication apparatus comprising:
   a first wavelet transformer configured to perform a wavelet transform to output a first component;
   a second wavelet transformer configured to perform a wavelet transform to output a second component; and
   a data generator configured to generate the data using both the first component and the second component, wherein:
   the data includes complex data, the data generator generates the complex data using both the first component and the second component as an in-phase component and an orthogonal component, respectfully.

2. The communication apparatus according to claim 1, wherein the first wavelet transformer involves M real coefficient wavelet filters, which are orthogonal with respect to each other, performs the wavelet transform.

3. The communication apparatus according to claim 1, further comprising a code converter configured to invert codes of outputs in odd-numbered places among M outputs from the second wavelet transformer (M is an integer not less than 2).

4. The communication apparatus according to claim 1, wherein:
   the first wavelet transformer has a first prototype filter including a first polyphase filter which possesses a real coefficient, M down samplers, M−1 one-sample delaying elements, and a fast M-points discrete cosine transformer (M is an integer not less than 2); and
   the second wavelet transformer has a second prototype filter including a second polyphase filter which possesses a real coefficient, M down samplers, M−1 one-sample delaying elements, and a fast M-points discrete sine transformer.

5. The communication apparatus according to claim 1, wherein the second wavelet transformer has a third prototype filter including a second polyphase filter which possesses a real coefficient, M down samplers, M−1 one-sample delaying elements, a time series inverter for inverting sequence of every M inputs among an input series, a fast M-points discrete cosine transformer, and a code converter for inverting codes in odd-numbered places in the input series.

6. The communication apparatus according to claim 1, further comprising an equalizer configured to equalize the complex data.

7. The communication apparatus according to claim 6, further comprising a decision unit configured to make a decision using the complex delta equalized by the equalizer.

8. The communication apparatus according to claim 1, further comprising a shifting unit configured to shift a frequency component, wherein the second component has the shifted frequency component.

9. The communication apparatus according to claim 8, further comprising a synchronization timing estimating unit configured to estimate a timing of synchronization of symbols from phase differences between adjacent subcarriers in the complex data.

10. A communication apparatus employing a multi-carrier transmission method which demodulates data, the communication apparatus comprising:
    a first wavelet transformer configured to perform a wavelet transform to output a first component;
    a second wavelet transformer configured to perform a wavelet transform to output a second component;
    a data generator configured to generate the data using both the first component and the second component; and
    an equalizer configured to equalize the data.

11. A communication apparatus employing a multi-carrier transmission method which demodulates data, the communication apparatus comprising:
    a first wavelet transformer configured to perform a wavelet transform to output a first component;
    a second wavelet transformer configured to perform a wavelet transform to output a second component;
    a data generator configured to generate the data using both the first component and the second component; and
    a decision unit configured to make a decision using the data.

12. A communication apparatus employing a multi-carrier transmission method which demodulates data, the communication apparatus comprising:
    a first wavelet transformer configured to perform a wavelet transform to output a first component;
    a second wavelet transformer configured to perform a wavelet transform to output a second component;
    a data generator configured to generate the data using both the first component and the second component; and
    a synchronization timing estimating unit configured to estimate a timing of synchronization of symbols from phase differences between adjacent subcarriers in the data.

13. A communication apparatus employing a multi-carrier transmission method which demodulates data, the communication apparatus comprising:
    a first wavelet transformer configured to perform a wavelet transform to output a first component;
    a second wavelet transformer configured to perform a wavelet transform to output a second component;
    a data generator configured to generate the data using both the first component and the second component; and
    a shifting unit configured to shift a frequency component, wherein:
    the second component has the shifted frequency component.

14. A communication apparatus employing a multi-carrier transmission method which modulates data, the communication apparatus comprising:
- a data decomposer configured to decompose the data into a first component and a second component;
- an inverse wavelet transformer configured to perform an inverse wavelet transform using both the first component and the second component to output a composite wave; and
- a synchronization data generator that generates synchronization data for synchronization that remain the same for a duration of several consecutive symbols and that are known in a receiver, wherein the inverse wavelet transformer performs the inverse wavelet transform of the synchronization data.

15. A circuit for a communication apparatus employing multi-carrier transmission method which demodulates data, the circuit comprising:
- a first wavelet transformer configured to perform a wavelet transform to output a first component;
- a second wavelet transformer configured to perform a wavelet transform to output a second component; and
- a data generator configured to generate the data using both the first component and the second component, wherein:
- the data includes complex data, and the data generator generates the complex data using both the first component and the second component as an in-phase component and an orthogonal component, respectfully.

16. The circuit for the communication apparatus according to claim 15, further comprising an equalizer configured to equalize the complex data.

17. The circuit for the communication apparatus, according to claim 16, further comprising a decision unit configured to make a decision using the complex data.

18. The circuit for the communication apparatus according to claim 15, further comprising a shifting unit configured to shift a frequency component, wherein the second component has the shifted frequency component.

19. The circuit for the communication apparatus according to claim 18, further comprising a synchronization timing estimating unit configured to estimate a timing of synchronization of symbols from phase differences between adjacent subcarriers in the complex data.

20. A data generating method for a communication apparatus employing a multi-carrier transmission method which demodulates data, the data generating method comprising:
- performing a first wavelet transform by a first wavelet transformer to output a first component;
- performing a second wavelet transform by a second wavelet transformer to output a second component; and
- generating the data using both the first component and the second component, wherein
- the data includes complex data, the data generator generates the complex data using both the first component and the second component as an in-phase component and an orthogonal component, respectfully.

21. The data generating method according to claim 20, further comprising equalizing the complex data.

22. The data generating method according to claim 21, further comprising making a decision using the complex data.

23. The data generating method according to claim 20, further comprising shifting a frequency component, wherein the second component has the shifted frequency component.

24. The data generating method according to claim 23, further comprising estimating a timing of synchronization of symbols from phase differences between adjacent subcarriers in the complex data.

* * * * *